(12) United States Patent
Maekawa et al.

(10) Patent No.: US 11,002,209 B2
(45) Date of Patent: May 11, 2021

(54) ENGINE CONTROL DEVICE

(71) Applicant: Mazda Motor Corporation, Hiroshima (JP)

(72) Inventors: Kota Maekawa, Hiroshima (JP); Takeatsu Ito, Hiroshima (JP); Tomokuni Kusunoki, Aki-gun (JP); Keitaro Ezumi, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 61 days.

(21) Appl. No.: 16/663,718

(22) Filed: Oct. 25, 2019

(65) Prior Publication Data

US 2020/0141345 A1 May 7, 2020

(30) Foreign Application Priority Data

Nov. 1, 2018 (JP) .............................. JP2018-206284

(51) Int. Cl.
*F02D 41/00* (2006.01)
*F02D 41/14* (2006.01)
*F02M 26/01* (2016.01)
*F02M 26/52* (2016.01)
*F02D 13/02* (2006.01)
*F02D 41/30* (2006.01)

(52) U.S. Cl.
CPC ..... *F02D 41/1461* (2013.01); *F02D 13/0215* (2013.01); *F02D 13/0249* (2013.01);
(Continued)

(58) Field of Classification Search
CPC ............. F02D 41/1461; F02D 41/0077; F02D 41/3005; F02D 41/3041; F02D 41/1456;
(Continued)

(56) References Cited

U.S. PATENT DOCUMENTS

| 10,641,192 | B2* | 5/2020 | Sueoka | ............... F02D 41/0065 |
| 2004/0139949 | A1* | 7/2004 | Koseki | .................. F02D 35/025 |
| | | | | 123/568.14 |

(Continued)

FOREIGN PATENT DOCUMENTS

JP H10068346 A 3/1998

*Primary Examiner* — Phutthiwat Wongwian
*Assistant Examiner* — Sherman D Manley
(74) *Attorney, Agent, or Firm* — Alleman Hall Creasman & Tuttle LLP

(57) ABSTRACT

An engine control device is provided, which includes an engine body where a cylinder is formed, an exhaust passage through which exhaust gas discharged from the engine body circulates, a $NO_x$ sensor disposed in the exhaust passage and configured to detect a concentration of $NO_x$ in the exhaust gas, an injector configured to change an air-fuel ratio inside the cylinder, an in-cylinder temperature changer configured to change a temperature inside the cylinder, and a controller configured to control the injector and the exhaust shutter valve. The controller controls the injector based on a detection value of the $NO_x$ sensor to variably set the air-fuel ratio inside the cylinder, and when a particular condition that the air-fuel ratio inside the cylinder is leaner than a preset upper limit is satisfied, and causes the in-cylinder temperature changer to raise the temperature inside the cylinder.

12 Claims, 9 Drawing Sheets

(52) U.S. Cl.
CPC ..... *F02D 13/0265* (2013.01); *F02D 41/0077* (2013.01); *F02D 41/3005* (2013.01); *F02M 26/01* (2016.02); *F02M 26/52* (2016.02)

(58) Field of Classification Search
CPC ............... F02D 41/006; F02D 41/1463; F02D 13/0215; F02D 13/0249; F02D 13/0265; F02D 35/026; F02M 26/01; F02M 26/52; Y02T 10/40
See application file for complete search history.

(56) References Cited

U.S. PATENT DOCUMENTS

| | | | | |
|---|---|---|---|---|
| 2008/0178836 | A1* | 7/2008 | Yamashita | F02B 17/00 123/295 |
| 2014/0060490 | A1* | 3/2014 | Iwai | F02D 37/02 123/478 |
| 2014/0060493 | A1* | 3/2014 | Iwai | F02P 5/1516 123/478 |
| 2014/0251252 | A1* | 9/2014 | Wasada | F02M 31/20 123/184.21 |
| 2014/0283784 | A1* | 9/2014 | Takahashi | F02D 41/3011 123/350 |
| 2015/0226143 | A1* | 8/2015 | Iwai | F02D 41/3035 123/294 |
| 2016/0201635 | A1* | 7/2016 | Nagano | F02D 37/02 123/491 |
| 2017/0058817 | A1* | 3/2017 | Tsumura | F02B 11/02 |

\* cited by examiner

ENGINE CONTROL DEVICE

TECHNICAL FIELD

The present disclosure relates to a control device for an engine provided with an engine body where a cylinder is formed, an exhaust passage through which exhaust gas discharged from the engine body passes, and a three-way catalyst provided to the exhaust passage.

BACKGROUND OF THE DISCLOSURE

Conventionally, a three-way catalyst is provided to an exhaust passage of an engine, and exhaust gas is purified by the three-way catalyst. In detail, the three-way catalyst is capable of purifying CO, HC, and $NO_x$ simultaneously when the air-fuel ratio of exhaust gas passing through the catalyst is near a stoichiometric air-fuel ratio. The three-way catalyst is provided to the exhaust passage and the air-fuel ratio of exhaust gas is controlled to be near the stoichiometric air-fuel ratio to purify CO, HC, and $NO_x$ simultaneously.

For example, JP1998-068346A discloses an engine which includes a three-way catalyst, an oxygen sensor, and a $NO_x$ sensor which are provided to an exhaust passage. The oxygen sensor is capable of detecting an air-fuel ratio of exhaust gas, and the $NO_x$ sensor is capable of detecting a concentration of $NO_x$ in the exhaust gas. The oxygen sensor is disposed at a location in the exhaust passage upstream of the three-way catalyst, and the $NO_x$ sensor is disposed at a location in the exhaust passage downstream of the three-way catalyst. This engine determines a basic value of the air-fuel ratio in a cylinder based on an output value of the oxygen sensor so that the air-fuel ratio of exhaust gas which flows into the three-way catalyst becomes a stoichiometric air-fuel ratio, and corrects the basic value using an output value of the $NO_x$ sensor.

Here, as a method of reducing $NO_x$ discharged from the engine, there is a method of reducing $NO_x$ itself generated in a combustion chamber by increasing the air-fuel ratio inside the combustion chamber (i.e., adjusting leaner). According to this method, fuel efficiency can be improved as well. However, by simply increasing the air-fuel ratio of exhaust gas, combustion stability tends to decline.

SUMMARY OF THE DISCLOSURE

The present disclosure is made in view of the above situations, and one purpose thereof is to provide a control device for an engine, capable of reducing an amount of $NO_x$ discharged from the engine, while securing combustion stability.

According to one aspect of the present disclosure, a control device for an engine including an engine body where a cylinder is formed, and an exhaust passage through which exhaust gas discharged from the engine body circulates, is provided. The control device includes a $NO_x$ sensor disposed in the exhaust passage and configured to detect a concentration of $NO_x$ in the exhaust gas, an injector configured to change an air-fuel ratio inside the cylinder, an in-cylinder temperature changer configured to change a temperature inside the cylinder, the in-cylinder temperature changer including an exhaust shutter valve, an exhaust variable valve timing mechanism (VVT), or the exhaust VVT and an intake VVT, and a controller including a processor configured to control the injector and the exhaust shutter valve. The controller controls the injector based on a detection value of the $NO_x$ sensor to variably set the air-fuel ratio inside the cylinder, and when a particular condition that the air-fuel ratio inside the cylinder is leaner than a preset upper limit is satisfied, and the controller causes the in-cylinder temperature changer to raise the temperature inside the cylinder.

According to this configuration, the air-fuel ratio inside the cylinder is changed based on a detected value of the $NO_x$ sensor, i.e., an actual $NO_x$ concentration detected by the $NO_x$ sensor. Therefore, the air-fuel ratio inside the cylinder is made into the air-fuel ratio such that the $NO_x$ concentration of exhaust gas becomes the desired concentration, and the amount of $NO_x$ discharged from the engine can be securely lowered. Further, when the air-fuel ratio inside the cylinder becomes leaner than the preset upper limit and the particular condition is satisfied, the combustion is stimulated by the temperature inside the cylinder being raised by the in-cylinder temperature changer. Therefore, the decline in combustion stability caused by the air-fuel ratio inside the cylinder becoming lean can be prevented, while making the air-fuel ratio inside the cylinder into the air-fuel ratio so that the $NO_x$ concentration becomes below the desired concentration as described above.

The in-cylinder temperature changer may include the exhaust shutter valve, and may be further configured to change an amount of internal exhaust gas recirculation (EGR) gas that is exhaust gas remaining inside the cylinder, and when the particular condition is satisfied, the controller may control the exhaust shutter valve to increase the amount of internal EGR gas.

According to this configuration, the temperature increase in the cylinder can be achieved with the simple configuration of increasing the amount of internal EGR gas.

The exhaust shutter valve may be provided in the exhaust passage and configured to open and close the exhaust passage, and when the particular condition is satisfied, the controller may control the exhaust shutter valve to adjust an opening of the exhaust shutter valve toward a closing side.

According to this configuration, by adjusting the opening of the exhaust shutter valve toward the closing side, the pressure inside the exhaust passage increases and the flow of the exhaust gas from the cylinder to the exhaust passage is restricted. Thus, the amount of internal EGR gas can effectively be increased and the temperature inside the cylinder can be raised quickly.

When the particular condition is satisfied, the controller may control the in-cylinder temperature changer so that an increasing amount of the temperature inside the cylinder becomes larger as a difference between the air-fuel ratio inside the cylinder and the upper limit increases.

According to this configuration, since the temperature inside the cylinder is raised according to the amount of the increase of the air-fuel ratio inside the cylinder from the upper limit, the temperature inside the cylinder can be appropriately raised according to the degrading condition of combustion stability.

The controller may control the injector to correct a target air-fuel ratio that is a target value of the air-fuel ratio inside the cylinder based on the detection value of the $NO_x$ sensor so that the corrected target air-fuel ratio is achieved, and when the corrected target air-fuel ratio becomes leaner than the upper limit, the controller may determine that the particular condition is satisfied.

According to this configuration, the temperature inside the cylinder can be raised before or immediately after the decline in combustion stability, and therefore, the decline in combustion stability can be prevented more securely.

When the particular condition is satisfied, the controller may control the in-cylinder temperature changer so that an increasing amount of the temperature inside the cylinder becomes larger as a difference between the target air-fuel ratio and the upper limit increases.

According to this configuration, since the temperature inside the cylinder is raised according to the amount of the increase of the target air-fuel ratio from the upper limit, the temperature inside the cylinder can be appropriately raised according to the degrading condition of combustion stability.

The control device may include an air-fuel ratio sensor disposed in the exhaust passage and configured to detect an air-fuel ratio in the exhaust gas. The controller may control the injector to correct the target air-fuel ratio that is the target value of the air-fuel ratio inside the cylinder based on the detection value of the $NO_x$ sensor. The controller may control the injector so that the corrected target air-fuel ratio is achieved based on a difference between a detection value of the air-fuel ratio sensor and the corrected target air-fuel ratio. When the corrected target air-fuel ratio becomes leaner than the upper limit, the controller may determine that the particular condition is satisfied.

The controller may control the injector so that the concentration of $NO_x$ detected by the $NO_x$ sensor becomes below a preset target value.

According to this configuration, the amount of $NO_x$ discharged from the engine can be kept low more securely.

The controller may control the injector so that partial compression ignition combustion in which spark ignition (SI) combustion of a portion of a mixture gas inside the cylinder is forcibly carried out by jump-spark ignition, and compression ignition (CI) combustion of the remaining mixture gas inside the cylinder is then carried out by self-ignition is performed at least in a part of an operating range of the engine. The controller may control the injector based on the detection value of the $NO_x$ sensor at least in a part of the operating range where the partial compression ignition combustion is performed.

According to this configuration, fuel efficiency can be improved while preventing an increase in combustion noise by carrying out the partial compression ignition combustion. Further, during the execution of the partial compression ignition combustion, the injector is controlled based on the detection value of the $NO_x$ sensor so that the discharging amount of $NO_x$ can be reduced while improving fuel efficiency.

According to another aspect of the present disclosure, a method of controlling an engine is provided. The method includes the steps of variably setting an air-fuel ratio inside a cylinder formed in an engine body of the engine based on a concentration of $NO_x$ in exhaust gas detected by a $NO_x$ sensor disposed in an exhaust passage through which the exhaust gas discharged from the engine body circulates, and when a particular condition that the air-fuel ratio inside the cylinder is leaner than a preset upper limit is satisfied, raising a temperature inside the cylinder.

DETAILED DESCRIPTION OF THE DISCLOSURE (1) Entire Configuration of Engine

Figure 1:
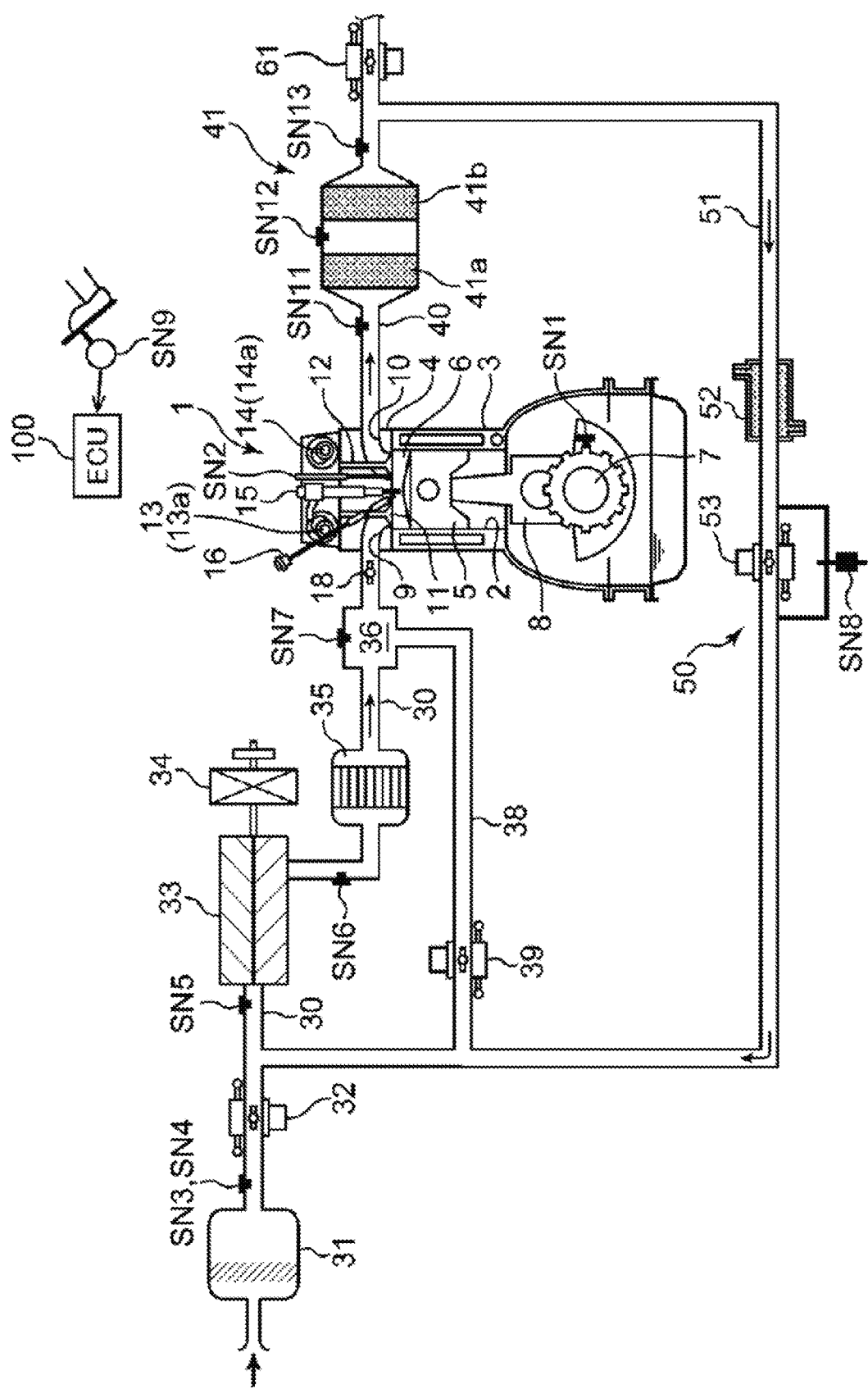
FIG. 1 is a system diagram schematically illustrating an entire configuration of an engine according to one embodiment of the present disclosure.

FIG. 1 is a view illustrating a desirable embodiment of an engine to which an air-fuel ratio control device of the present disclosure is applied. The engine illustrated in this figure is a direct-injection gasoline engine of four cycles, which is mounted on a vehicle as a power source for propelling the vehicle. The engine includes an engine body 1, an intake passage 30 through which intake air introduced into the engine body 1 flows, an exhaust passage 40 through which exhaust gas discharged from the engine body 1 flows, and an exhaust gas recirculation (EGR) device 50 which recirculates a part of exhaust gas which circulates in the exhaust passage 40 back to the intake passage 30.

The engine body 1 includes a cylinder block 3 where cylinders 2 are formed, a cylinder head 4 attached to an upper surface of the cylinder block 3 so as to cover the cylinders 2 from above, and pistons 5 respectively inserted into the cylinders 2 so as to be reciprocatable. Although the engine body 1 is typically a multicylinder engine having a plurality of cylinders (for example, four cylinders lined up in a direction perpendicular to the drawing sheet of FIG. 1), only one cylinder 2 will be described herein for simplifying the description.

A combustion chamber 6 is defined above the piston 5, and fuel of which a main component is gasoline is supplied to the combustion chamber 6 by an injection from an injector 15 (described later). Then, the supplied fuel combusts while being mixed with air inside the combustion chamber 6, and the piston 5 pushed downwardly by an expanding force generated by the combustion reciprocates in the vertical direction. The fuel may contain a subcomponent, such as bioethanol, in addition to gasoline. Hereinafter, an amount of fuel injected from the injector 15 is simply referred to as the "injection amount."

Below the piston 5, a crankshaft 7 which is an output shaft of the engine body 1 is provided. The crankshaft 7 is coupled to the piston 5 through a connecting rod 8, and is rotated about a center axis thereof according to the reciprocating motion (up-and-down motion) of the piston 5.

A geometric compression ratio of the cylinder 2, i.e., a ratio between the volume of the combustion chamber 6 when the piston 5 is at a top dead center and the volume of the combustion chamber 6 when the piston 5 is at a bottom dead center, is set as 13:1 or larger and 30:1 or smaller, as a suitable ratio for SPCCI combustion (partial compression ignition combustion) described later. In more detail, the geometric compression ratio of the cylinder 2 is desirably set 14:1 or larger and 17:1 or smaller in the case of a regular gasoline specification in which gasoline fuel of which the octane number is about 91 is used, and set 15:1 or larger and 18:1 or smaller in the case of a high-octane gasoline specification in which gasoline fuel of which the octane number is about 96 is used.

The cylinder block 3 is provided with a crank angle sensor SN1 which detects a rotation angle of the crankshaft 7 (crank angle) and a rotation speed (engine speed) of the crankshaft 7.

The cylinder head 4 is provided with an intake port 9 and an exhaust port 10 which open in the combustion chamber 6, an intake valve 11 which opens and closes the intake port 9, and an exhaust valve 12 which opens and closes the exhaust port 10. Note that a valve configuration of the engine of this embodiment is four valve type comprised of two intake valves and two exhaust valves, and therefore, two intake ports 9, two exhaust ports 10, two intake valves 11, and two exhaust valves 12 are provided to each cylinder 2. In this embodiment, a swirl valve 18 which can be opened and closed is provided to one of the two intake ports 9 connected to one cylinder 2 to change the strength of a swirl flow inside the cylinder 2 (a swiveling flow which circles about a cylinder axis).

The intake valve 11 and the exhaust valve 12 are opened and closed by valve operating mechanisms 13 and 14 including a pair of cam shafts disposed in the cylinder head 4 so that the valves are interlocked with the rotation of the crankshaft 7.

An intake VVT (variable valve timing mechanism) 13a which can change at least an open timing of the intake valve 11 is built in the valve operating mechanism 13 for intake valve 11. Similarly, an exhaust VVT 14a which can change at least a close timing of the exhaust valve 12 is built in the valve operating mechanism 14 for the exhaust valve 12. By the control of the intake VVT 13a and the exhaust VVT 14a, in this embodiment, it is possible to adjust a valve overlap period during which both the intake valve 11 and the exhaust valve 12 open through an exhaust top dead center, and by this adjustment of the valve overlap period, it is possible to adjust an amount of burnt gas which remains inside the combustion chamber 6 (internal EGR gas). Note that the intake VVT 13a (exhaust VVT 14a) may be a variable mechanism of a type in which only the close timing (open timing) of the intake valve 11 (exhaust valve 12) is changed while the open timing (close timing) is fixed, or may be a variable mechanism of a phase type in which the open timing and the close timing of the intake valve 11 (exhaust valve 12) are changed simultaneously.

The cylinder head 4 is provided with the injector 15 which injects fuel (mainly gasoline) into the combustion chamber 6, and an ignition plug 16 which ignites a mixture gas comprised of the fuel injected into the combustion chamber 6 from the injector 15 and air introduced into the combustion chamber 6. The cylinder head 4 is further provided with an in-cylinder pressure sensor SN2 which detects an in-cylinder pressure which is a pressure inside the combustion chamber 6.

The injector 15 is a multiple nozzle hole injector in which a plurality of nozzle holes are formed in a tip end thereof, and capable of injecting fuel radially from the plurality of nozzle holes. The injector 15 is provided so that the tip end thereof opposes to a central part of a crown surface of the piston 5. Note that although illustration is omitted, in this embodiment, a cavity is formed in the crown surface of the piston 5 so that a comparatively large area including the central part of the crown surface is dented to the opposite side (downwardly) from the cylinder head 4.

The ignition plug 16 is disposed at a position offset slightly to the air intake side from the injector 15.

The intake passage 30 is connected to one side surface of the cylinder head 4 so as to communicate with the intake port 9. Air (fresh air) taken in from an upstream end of the intake passage 30 is introduced into the combustion chamber 6 through the intake passage 30 and the intake port 9.

The intake passage 30 is provided with an air cleaner 31 which removes the foreign substance under air intake, a throttle valve 32 which can be opened and closed to adjust a flow rate of intake air, a supercharger 33 which sends out intake air while compressing the air, an intercooler 35 which cools the intake air compressed by the supercharger 33, and a surge tank 36, in this order from the upstream.

Corresponding parts of the intake passage 30 are provided with an airflow sensor SN3 which detects a flow rate of intake air, first and second intake air temperature sensors SN4 and SN6 each of which detects a temperature of intake air, and first and second intake pressure sensors SN5 and SN7 each of which detects a pressure of intake air. The airflow sensor SN3 and the first intake air temperature sensor SN4 are provided to a portion of the intake passage 30 between the air cleaner 31 and the throttle valve 32, and detect a flow rate and a temperature of the intake air which passes through this portion, respectively. The first intake pressure sensor SN5 is provided to a portion of the intake passage 30 between the throttle valve 32 and the supercharger 33 (downstream of a connection port of an EGR passage 51 described later), and detects a pressure of intake air which passes through this portion. The second intake air temperature sensor SN6 is provided to a portion of the intake passage 30 between the supercharger 33 and the intercooler 35, and detects a temperature of intake air which passes through this portion. The second intake pressure sensor SN7 is provided to the surge tank 36, and detects a pressure of intake air inside the surge tank 36.

The supercharger 33 is a mechanical supercharger which is mechanically linked with the engine body 1. Although the supercharger 33 is not limited to a particular type, any known supercharger, such as Lysholm, Root, or centrifugal type supercharger, can be used as the supercharger 33. Between the supercharger 33 and the engine body 1, an electromagnetic clutch 34 which can electrically switch between "connect (engage)" and "disconnect (disengage)" is provided. When the electromagnetic clutch 34 is connected, a driving force is transmitted from the engine body 1 to the supercharger 33, and the supercharger 33 performs a boost. On the other hand, when the electromagnetic clutch 34 is disconnected, the transfer of the driving force is intercepted, and thereby the boost by the supercharger 33 is suspended.

A bypass passage 38 for bypassing the supercharger 33 is provided to the intake passage 30. The bypass passage 38 mutually connects the surge tank 36 and the EGR passage 51 (described later). A by-pass valve 39 which can be opened and closed is provided to the bypass passage 38. The by-pass valve 39 is a valve for adjusting, the pressure, i.e., the boost pressure, of intake air introduced into the surge tank 36. For example, a flow rate of intake air which recirculates to upstream of the supercharger 33 through the bypass passage 38 increases as the opening of the by-pass valve 39 increases, and as a result, the boost pressure decreases.

The exhaust passage 40 is connected to the other side surface of the cylinder head 4 so as to communicate with the exhaust port 10. Burnt gas (exhaust gas) generated inside the combustion chamber 6 is discharged outside through the exhaust port 10 and the exhaust passage 40.

A catalytic converter 41 is provided to the exhaust passage 40. A three-way catalyst 41*a* and a GPF (Gasoline Particulate Filter) 41*b* are built in the catalytic converter 41 in this order from upstream.

The three-way catalyst 41*a* is to purify hazardous components (HC, CO, and $NO_x$) contained in exhaust gas which circulates the exhaust passage 40. In detail, when an air-fuel ratio of exhaust gas which passes through the three-way catalyst 41*a* is near and higher than a stoichiometric air-fuel ratio (lean), the three-way catalyst 41*a* purifies (oxidizes) HC and CO at a high purification rate, and on the other hand, when the air-fuel ratio of exhaust gas is near and lower than the stoichiometric air-fuel ratio (rich), purifies (reduces) $NO_x$ at a high purification rate. The GPF 41*b* is to capture particulate matter (PM) contained in exhaust gas.

Corresponding parts of the exhaust passage 40 are provided with a linear air-fuel (A/F) sensor SN11 and a $\lambda O_2$ sensor SN12 each of which detects an air-fuel ratio of exhaust gas, and a $NO_x$ sensor SN13 which detects a concentration of $NO_x$ contained in exhaust gas.

The linear A/F sensor SN11 is provided to a portion of the exhaust passage 40 upstream of the catalytic converter 41, and detects the air-fuel ratio of exhaust gas which flows into the catalytic converter 41. The $\lambda O_2$ sensor SN12 is provided to a portion of the exhaust passage 40 downstream of the three-way catalyst 41*a* and upstream of the GPF 41*b*, and is attached to a portion between the three-way catalyst 41*a* and the GPF 41*b* of the catalytic converter 41. The $\lambda O_2$ sensor SN12 detects the air-fuel ratio of exhaust gas after passing through the three-way catalyst 41*a*. The $NO_x$ sensor SN13 is provided to a portion of the exhaust passage 40 downstream of the catalytic converter 41, and detects a $NO_x$ concentration of exhaust gas which flowed out of the catalytic converter 41. In detail, the $NO_x$ sensor SN13 is provided to a portion immediately downstream of the catalytic converter 41 and upstream of a portion of the exhaust passage 40 to which the EGR passage 51 (described later) is connected.

The linear A/F sensor SN11 is a so-called all-range type A/F sensor, and outputs a value substantially proportional to the air-fuel ratio over a wide range. The $\lambda O_2$ sensor SN12 is a so-called $O_2$ sensor, and outputs a value according to the air-fuel ratio only when the air-fuel ratio is near the stoichiometric air-fuel ratio. These sensors are well-known, and therefore, the detailed description of the structure is omitted.

Figure 2:
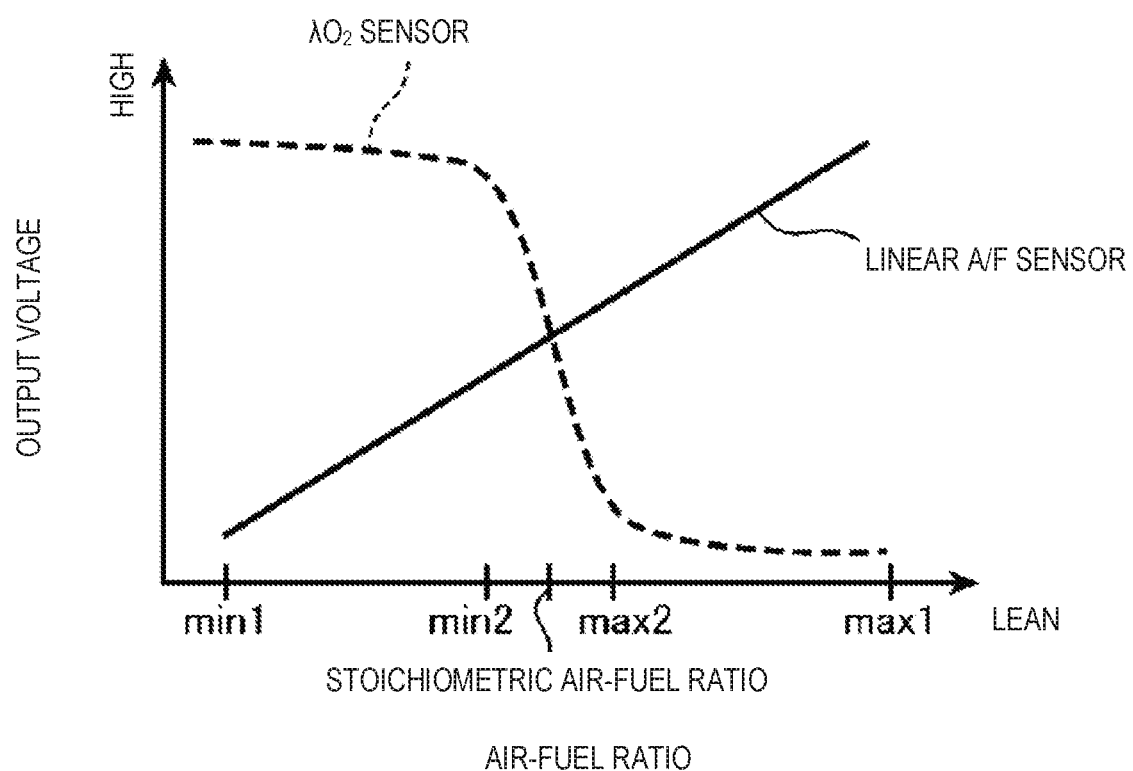
FIG. 2 is a graph illustrating a relation between each of output values of a linear air-fuel (A/F) sensor and a $\lambda O_2$ sensor, and an air-fuel ratio.

The relationships between the output values of the linear A/F sensor SN11 and the $\lambda O_2$ sensor SN12, and the air-fuel ratio are briefly described using FIG. 2. FIG. 2 is a graph illustrating the relationships between the output values (output voltages) of the sensors SN11 and SN12, and the air-fuel ratio. In FIG. 2, a solid line indicates the output value of the linear A/F sensor SN11, and a broken line indicates the output value of the $\lambda O_2$ sensor SN12.

As illustrated by the solid line in FIG. 2, the output value of the linear A/F sensor SN11 changes according to the air-fuel ratio over a wide range of the air-fuel ratio from a first air-fuel ratio mini which is sufficiently lower than the stoichiometric air-fuel ratio to a second air-fuel ratio maxi which is sufficiently higher than the stoichiometric air-fuel ratio. The output value of the linear A/F sensor SN11 changes substantially in proportion to the air-fuel ratio.

On the other hand, as illustrated by the broken line in FIG. 2, although the output value of the $\lambda O_2$ sensor SN12 changes according to the air-fuel ratio from a third air-fuel ratio min 2 which is slightly lower than the stoichiometric air-fuel ratio to a fourth air-fuel ratio max 2 which is slightly higher than the stoichiometric air-fuel ratio, it almost never changes according to the air-fuel ratio if the air-fuel ratio deviates from this range. Thus, the range of the air-fuel ratio detectable by the $\lambda O_2$ sensor SN12 is limited to near the stoichiometric air-fuel ratio, and is narrower than the range of the air-fuel ratio detectable by the linear A/F sensor SN11. Therefore, in the area deviated from near the stoichiometric air-fuel ratio, the detection accuracy of the air-fuel ratio by the $\lambda O_2$ sensor SN12 becomes lower than the detection accuracy of the linear A/F sensor SN11. However, as being clear from the comparison between the broken line and the solid line in FIG. 2, the amount of change in the output value of the $\lambda O_2$ sensor SN12 with respect to the air-fuel ratio near the stoichiometric air-fuel ratio is larger than the amount of change in the output value of the linear A/F sensor SN11 with respect to the air-fuel ratio. Therefore, near the stoichiometric air-fuel ratio, the detection accuracy of the air-fuel ratio by the $\lambda O_2$ sensor SN12 becomes higher than that by the linear A/F sensor SN11.

The EGR device 50 has the EGR passage 51 which connects the exhaust passage 40 with the intake passage 30, and an EGR cooler 52 and an EGR valve 53 which are provided to the EGR passage 51. The EGR passage 51 mutually connects a portion of the exhaust passage 40 downstream of the catalytic converter 41 and a portion of the intake passage 30 between the throttle valve 32 and the supercharger 33. The EGR cooler 52 cools, by a heat exchange, exhaust gas (external EGR gas) which recirculates from the exhaust passage 40 to the intake passage 30 through the EGR passage 51. The EGR valve 53 is provided to the EGR passage 51 downstream of the EGR cooler 52 (closer to the intake passage 30) so as to be openable and closable, and adjusts a flow rate of exhaust gas which circulates the EGR passage 51. A pressure difference sensor SN8 which detects a difference between a pressure upstream of the EGR valve 53 and a pressure downstream of the EGR valve 53 is provided to the EGR passage 51.

An exhaust shutter valve 61 which opens and closes the exhaust passage 40 is provided to the exhaust passage 40. The exhaust shutter valve 61 is attached to a portion of the exhaust passage 40 downstream of a connection with the EGR passage 51. The exhaust shutter valve 61 is opened and closed by a drive unit (not illustrated) to change a channel area of the exhaust passage 40.

(2) Control System

Figure 3:
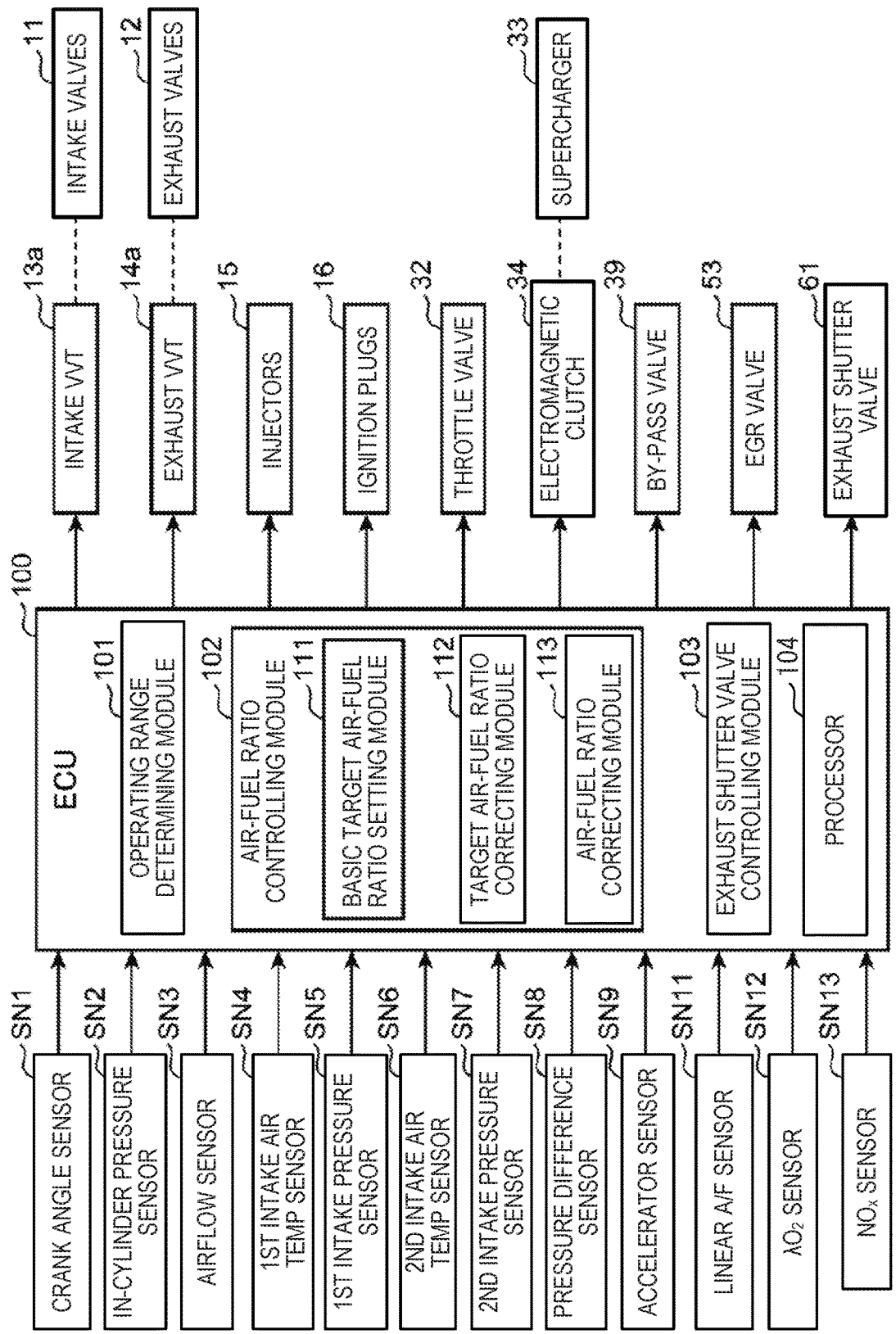
FIG. 3 is a block diagram illustrating a control system of the engine.

FIG. 3 is a block diagram illustrating a control system of the engine. An ECU 100 illustrated in this figure is a microprocessor which totally controls the engine, and is comprised of a well-known processor 104 such as a central processing unit (CPU) having associated ROM, RAM, etc.

Detection signals of various sensors are inputted into the ECU 100. For example, the ECU 100 is electrically connected to the crank angle sensor SN1, the in-cylinder pressure sensor SN2, the airflow sensor SN3, the first and second intake air temperature sensors SN4 and SN6, the first and second intake pressure sensors SN5 and SN7, the pressure difference sensor SN8, and the linear A/F sensor SN11, the $\lambda O_2$ sensor SN12, and the $NO_x$ sensor SN13, which are described above. Information detected by these sensors (i.e., the crank angle, the engine speed, the in-cylinder pressure, the intake air flow rate, the intake air temperature, the intake pressure, the pressure difference of before and after the EGR valve 53, etc.), the air-fuel ratio of exhaust gas, and the $NO_x$ concentration of exhaust gas are sequentially inputted into the ECU 100. Moreover, the vehicle is provided with an accelerator sensor SN9 which detects an opening of the accelerator pedal operated by a driver who operates the vehicle, and this detection signal of the accelerator sensor SN9 is also inputted into the ECU 100.

The ECU 100 controls each part of the engine, while performing various determinations, calculations, etc. based on the input signals from the respective sensors. That is, the ECU 100 is electrically connected to the intake VVT 13a, the exhaust VVT 14a, the injector 15, the ignition plug 16, the throttle valve 32, the electromagnetic clutch 34, the by-pass valve 39, the EGR valve 53, etc., and outputs control signals to the respective devices based on the results of the calculation, etc. The ECU 100 is one example of a "controller."

The ECU 100 includes, functionally, the operating range determining module 101, the air-fuel ratio controlling module 102, and an exhaust shutter valve controlling module 103. The processor 104 executes these modules to perform their respective functions. These modules are stored in non-transitory memory of the ECU 100 as software.

(3) Control According to Operating State

Figure 4:
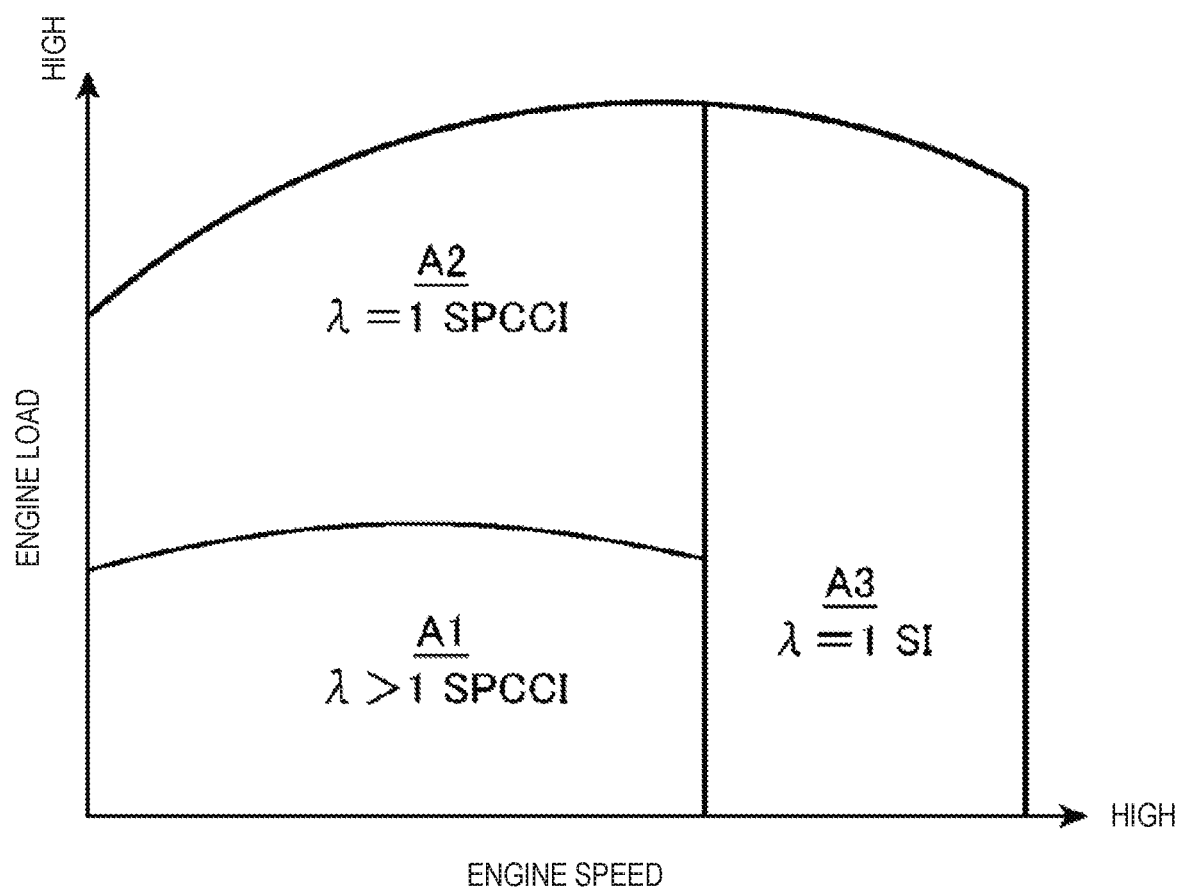
FIG. 4 is a characteristic chart of an operating range of the engine, where the operating range is classified into sub-ranges according to a combustion mode.

FIG. 4 is a characteristic chart illustrating a difference of the control according to the engine speed/load. As illustrated in this figure, the operating range of the engine can be roughly subdivided into three operating ranges A1-A3. Suppose that these operating ranges are a first operating range A1, a second operating range A2, and a third operating range A3, the first operating range A1 is a low-speed low-load range where both the engine speed and the engine load are low, the second operating range A2 is a low-speed high-load range where the engine speed is low and the engine load is high, and the third operating range A3 is a high-speed range where the engine speed is high. The ECU 100 determines in which operating range (the first to third operating ranges A1-A3) the current operating point is included based on the engine speed and the engine load which are detected by the crank angle sensor SN1, and then carries out the following control. The determination of the operating range is carried out by the operating range determining module 101. Note that the ECU 100 calculates the engine load based on the opening of the accelerator pedal detected by the accelerator sensor SN9, the engine speed, etc.

(a) First Operating Range A1 and Second Operating Range A2

In the first operating range A1 and the second operating range A2, partial compression ignition combustion (hereinafter, referred to as "SPCCI combustion") in which SI combustion and CI combustion are mixed is performed. Note that "SPCCI" in SPCCI combustion is an abbreviation of "Spark Controlled Compression Ignition."

SI combustion is a combustion mode in which the ignition plug 16 ignites the mixture gas, and the mixture gas is forcibly combusted by flame propagation which expands a combusting area from the ignited point to the perimeter. CI combustion is a combustion mode in which the mixture gas is combusted by self-ignition under an environment raised to a high temperature and a high pressure by compression of the piston 5. SPCCI combustion which is a mixture or combination of SI combustion and CI combustion is a combustion mode in which SI combustion of a portion of the mixture gas inside the combustion chamber 6 is carried out by jump-spark ignition performed under an environment immediately before the mixture gas self-ignites, and CI combustion of the remaining mixture gas inside the combustion chamber 6 is carried out by self-ignition after SI combustion (after a further increase in the temperature and the pressure accompanying SI combustion).

Figure 5:
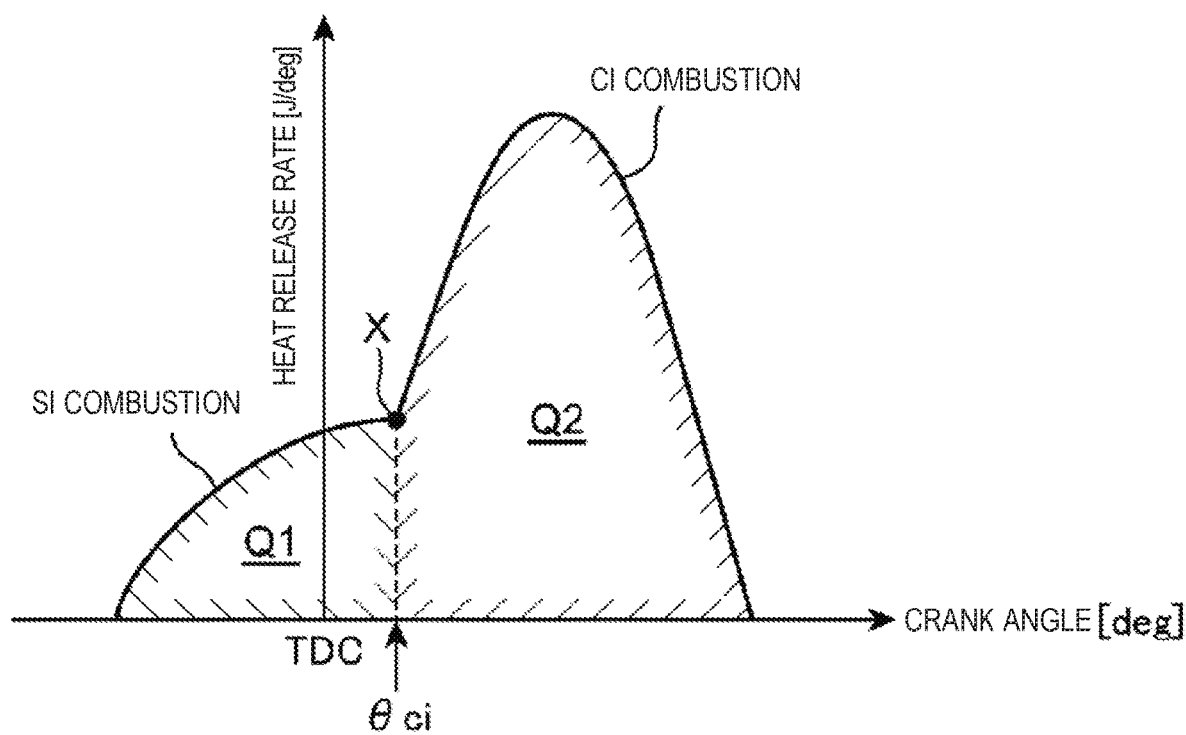
FIG. 5 is a graph illustrating a waveform of a rate of heat release during SPCCI combustion (partial compression ignition combustion).

FIG. 5 is a graph illustrating a change in a rate of heat release (J/deg) to the crank angle when SPCCI combustion occurs. In SPCCI combustion, the heat release during SI combustion becomes milder than the heat release during CI combustion. For example, as illustrated in FIG. 5, a waveform of the rate of heat release when SPCCI combustion is performed becomes small relatively in the rising slope. Moreover, the pressure fluctuation in the combustion chamber 6 (i.e., $dP/d\theta$: P is the in-cylinder pressure and $\theta$ is the crank angle) during SI combustion also becomes milder than that during CI combustion. In other words, the waveform of the rate of heat release during SPCCI combustion is formed so that a first rate-of-heat-release part (a portion indicated by Q1) formed by SI combustion where the rising slope is relatively small and a second rate-of-heat-release part (a portion indicated by Q2) formed by CI combustion where the rising slope is relatively large continue in this order.

When the temperature and the pressure inside the combustion chamber 6 increase by SI combustion, the unburnt mixture gas self-ignites accordingly, and CI combustion is then started. As illustrated in FIG. 5, the slope of the waveform for the rate of heat release changes from small to large at a timing of the self-ignition (i.e., a timing at which CI combustion starts). That is, the waveform of the rate of heat release in SPCCI combustion has a point of inflection (indicated by an "X" in FIG. 5) which appears at a timing $\theta ci$ where CI combustion starts.

After the start of CI combustion, SI combustion and CI combustion are performed in parallel. In CI combustion, since the heat release is larger than SI combustion, the rate of heat release becomes relatively large. However, since CI combustion is performed after a compression top dead center, the slope of the waveform for the rate of heat release will not become excessive. That is, since a motoring pressure decreases due to a descent of the piston 5 when the piston 5 passes through the compression top dead center, this reduces the rise of the rate of heat release, and as a result, it is avoided that $dp/d\theta$ during CI combustion becomes excessive. Thus, in SPCCI combustion, because of the nature in which CI combustion is performed after SI combustion, $dp/d\theta$ used as an index of combustion noise is difficult to become excessive, and therefore, combustion noise can be reduced compared with simple CI combustion (when carrying out CI combustion for all of the fuel).

SPCCI combustion is also ended with the end of CI combustion. Since a combustion speed of CI combustion is fast compared with SI combustion, it can bring the end time of combustion forward compared with the simple SI combustion (when carrying out SI combustion for all of the fuel). In other words, by SPCCI combustion, the end time of combustion can be brought closer to the compression top dead center in expansion stroke. Therefore, in SPCCI combustion, fuel efficiency can be improved compared with the simple SI combustion.

(First Operating Range)

In the first operating range A1 where the load is low, among the range where SPCCI combustion is performed, the air-fuel ratio (A/F) inside the combustion chamber 6 is made higher than the stoichiometric air-fuel ratio (lean) in order to improve fuel efficiency. That is, the injector 15 injects into the combustion chamber 6 such an amount of fuel that the air-fuel ratio (A/F) inside the combustion chamber 6 becomes higher than the stoichiometric air-fuel ratio. Here, when the air-fuel ratio inside the combustion chamber 6 is made higher than the stoichiometric air-fuel ratio, it becomes impossible for the three-way catalyst 41a to fully purify $NO_x$. Therefore, in the first operating range A1, the air-fuel ratio inside the combustion chamber 6 is made higher to the extent of an amount of raw $NO_x$ which is $NO_x$ generated inside the combustion chamber 6 becoming sufficiently small. That is, when the air-fuel ratio inside the combustion chamber 6 is sufficiently high, since the temperature inside the combustion chamber 6 can be kept low, the generated amount of $NO_x$ decreases. In this embodiment, the air-fuel ratio inside the combustion chamber 6 is set to about 30:1 in the first operating range A1. The details of this control of the air-fuel ratio will be described later.

Note that λ in FIG. 4 indicates an excess air factor, the excess air factor "λ=1" means that the air-fuel ratio inside the combustion chamber 6 is the stoichiometric air-fuel ratio, and the excess air factor "λ>1" means that the air-fuel ratio inside the combustion chamber 6 is higher than the stoichiometric air-fuel ratio.

Moreover, in the first operating range A1, each part of the engine is controlled by the ECU 100 as follows, so that SPCCI combustion is achieved.

The injector 15 injects the entire amount of fuel to be injected in one cycle, or most of the entire amount of fuel during a compression stroke. For example, in the first operating range A1, the injector 15 injects the fuel in two parts during a period from the middle stage to the later stage of the compression stroke. The ignition plug 16 ignites the mixture gas near the compression top dead center. By using this ignition as a trigger, SPCCI combustion is started, a portion of the mixture gas inside the combustion chamber 6 combusts by flame propagation (SI combustion), and the remaining mixture gas then combusts by self-ignition (CI combustion).

The intake VVT 13a and the exhaust VVT 14a set the timings of the intake and exhaust valves 11 and 12 so that the valve overlap period during which both the intake and exhaust valves 11 and 12 are opened is fully formed over the exhaust top dead center. Therefore, the internal EGR that makes burnt gas remain inside the combustion chamber 6 is achieved, and thereby, the temperature (an initial temperature before compression) inside the combustion chamber 6 is raised.

The throttle valve 32 is fully opened. The EGR valve 53 is opened to a given opening, and gas inside the exhaust passage 40 is introduced into the combustion chamber 6 as external EGR gas. In the first operating range A1, since the air-fuel ratio (A/F) is set as leaner than the stoichiometric air-fuel ratio as described above, and in addition, the EGR gas (external EGR gas and internal EGR gas) is introduced into the combustion chamber 6, a gas-fuel ratio (G/F) which is a weight ratio of the entire gas to the fuel inside the combustion chamber 6 becomes lean.

The swirl valve 18 is closed to a low opening which is fully closed or nearly fully closed. Therefore, the strong swirl flow is formed inside the combustion chamber 6. This swirl flow grows during an intake stroke, and remains until the middle of the compression stroke. Therefore, when fuel is injected during the compression stroke as described above, stratification of the fuel is achieved by an action of the swirl flow. That is, when fuel is injected after the middle stage of the compression stroke under a situation where the swirl flow exists, the injected fuel is collected to a central part of the combustion chamber 6 where the swirl flow is comparatively weak. Therefore, the stratification of fuel is achieved because a concentration difference arises in which the fuel concentration in the central part of the combustion chamber 6 becomes dense compared with an area outside the central part (perimeter part).

The supercharger 33 is switched to an OFF state in a partial range of the first operating range A1 where the engine speed is low. That is, while the electromagnetic clutch 34 is disconnected to release the connection between the supercharger 33 and the engine body 1, the boost by the supercharger 33 is suspended by fully opening the by-pass valve 39. On the other hand, in a partial range of the operating ranges A1 where the engine speed is high, the supercharger 33 is switched to an ON state. That is, the boost by the supercharger 33 is performed by connecting the electromagnetic clutch 34 to connect the supercharger 33 and the engine body 1. Here, the opening of the by-pass valve 39 is controlled so that the pressure inside the surge tank 36 (boost pressure) detected by the second intake pressure sensor SN7 becomes in agreement with a target pressure defined beforehand for every operating condition (the engine speed and the load).

The control of the exhaust shutter valve 61 in the first operating range A1 will be described later.

(Second Operating Range)

The second operating range A2 is a range where the engine load is high and the amount of fuel supplied to the combustion chamber 6 is large compared with the first operating range A1. Therefore, in the second operating range A2, it is difficult to make the air-fuel ratio inside the combustion chamber 6 high to the extent to sufficiently reduce the amount of raw $NO_x$. Thus, in the second operating range A2, the air-fuel ratio of exhaust gas, i.e., the air-fuel ratio inside the combustion chamber 6, is made into the stoichiometric air-fuel ratio to purify $NO_x$ in the three-way catalyst 41a. That is, in the second operating range A2, the air-fuel ratio inside the combustion chamber 6 is fundamentally made into the stoichiometric air-fuel ratio. Similar to the above, the details of this control of the air-fuel ratio will be described later.

Moreover, in the second operating range A2, each part of the engine is controlled by the ECU 100 as follows so that SPCCI combustion is achieved.

The injector 15 injects a portion of fuel to be injected in one cycle during the intake stroke, and injects the remaining fuel during the compression stroke. The ignition plug 16 ignites the mixture gas near the compression top dead center. Also in the second operating range A2, SPCCI combustion is started using this ignition as a trigger, a portion of the mixture gas inside the combustion chamber 6 combusts by flame propagation (SI combustion), and the remaining mixture gas then combusts by self-ignition (CI combustion).

The intake VVT 13a and the exhaust VVT 14a control the valve timings of the intake valve 11 and the exhaust valve 12 so that the internal EGR is performed only in a lower-load part of the second operating range A2 (in other words, the internal EGR is suspended on a higher load side).

The throttle valve 32 is fully opened. The EGR valve 53 is controlled so that the amount of exhaust gas which recirculates through the EGR passage 51 (external EGR gas) decreases as the load becomes higher. Near the highest engine load, the EGR valve 53 is fully closed, and the amount of external EGR gas is made nearly zero. In connection with this, also in the second operating range A2, the gas-fuel ratio (G/F) inside the combustion chamber 6 is made lean, except for the vicinity of the highest engine load.

The swirl valve 18 is opened to a suitable middle opening other than "fully closed" and "fully open," and the opening is made larger as the load becomes high.

The supercharger 33 is made into the OFF state in a partial range of the second operating range A2 where both the engine speed and the engine load are low. On the other hand, in the other partial range of the second operating range A2, the supercharger 33 is made into the ON state.

In the second operating range A2, the exhaust shutter valve 61 is fully opened.

(b) Third Operating Range

In the third operating range A3 which is on the higher engine speed side of the first and second operating ranges A1 and A2, comparatively orthodox SI combustion is performed. In order to achieve the SI combustion, each part of the engine is controlled by the ECU 100 as follows in the third operating range A3.

The injector 15 injects the fuel over a given period which overlaps with at least the intake stroke. The ignition plug 16 ignites the mixture gas near the compression top dead center. In the third operating range A3, SI combustion is started using this ignition as a trigger, and the entire mixture gas inside the combustion chamber 6 combusts by flame propagation.

The supercharger 33 is made into the ON state. The throttle valve 32 is fully opened. The valve opening of the EGR valve 53 is controlled so that the air-fuel ratio (A/F) inside the combustion chamber 6 becomes at or slightly richer than the stoichiometric air-fuel ratio. On the other hand, the gas-fuel ratio (G/F) inside the combustion chamber 6 is made lean except for the vicinity of the highest engine load. The swirl valve 18 is fully opened. The exhaust shutter valve 61 is fully opened.

(4) Control of Air-fuel Ratio

Next, the details of the control of the air-fuel ratio performed in the first operating range A1 and the second operating range A2, i.e., the range in which SPCCI combustion is carried out, are described. The control of the air-fuel ratio is carried out by the air-fuel ratio controlling module 102. The air-fuel ratio controlling module 102 includes, functionally, a basic target air-fuel ratio setting module 111, a target air-fuel ratio correcting module 112, and an air-fuel ratio correcting module 113.

The basic target air-fuel ratio setting module 111 sets a fundamental value of a target air-fuel ratio which is a target value of the air-fuel ratio inside the combustion chamber 6. Suitably, the fundamental value of the target air-fuel ratio is referred to as a "basic target air-fuel ratio."

The target air-fuel ratio correcting module 112 corrects the basic target air-fuel ratio set by the basic target air-fuel ratio setting module 111. Below, the target air-fuel ratio after being corrected by the target air-fuel ratio correcting module 112 is suitably referred to as an "instructed target air-fuel ratio."

The air-fuel ratio correcting module 113 corrects the injection amount based on the detection value of the linear A/F sensor SN11 so that the air-fuel ratio inside the combustion chamber 6 becomes the instructed target air-fuel ratio. Thus, in this embodiment, the air-fuel ratio inside the combustion chamber 6 is adjusted by the correction of the injection amount, and therefore, the injector 15 is one example of an "air-fuel ratio changer."

The details of the control carried out by the air-fuel ratio correcting module 113 are described first.

The air-fuel ratio correcting module 113 calculates the air-fuel ratio of exhaust gas detected at the position of the linear A/F sensor SN11, supposing the air-fuel ratio inside the combustion chamber 6 is set as the instructed target air-fuel ratio based on a distance between the combustion chamber 6 and the linear A/F sensor SN11, and the flow rate of intake air detected by the airflow sensor SN3 (hereinafter, this calculated value is referred to as a "target exhaust gas air-fuel ratio"). Then, the air-fuel ratio correcting module 113 carries out a feedback control of the injection amount so that the air-fuel ratio of exhaust gas detected by the linear A/F sensor SN11 becomes the target exhaust gas air-fuel ratio.

In detail, the air-fuel ratio correcting module 113 estimates an amount of air inside the combustion chamber 6 based on the flow rate of intake air detected by the airflow sensor SN3. Then, a basic injection amount which is the fundamental injection amount is calculated based on the air amount and the instructed target air-fuel ratio. Moreover, the air-fuel ratio correcting module 113 compares the air-fuel ratio of exhaust gas detected by the linear A/F sensor SN11 (hereinafter, referred to as a "first actual exhaust gas air-fuel ratio) and the target exhaust gas air-fuel ratio. Then, when the first actual exhaust gas air-fuel ratio is higher (leaner) than the target exhaust gas air-fuel ratio, since it means that the injection amount is short, the air-fuel ratio correcting module 113 carries out a correction to increase the basic injection amount by an amount corresponding to a value obtained by subtracting the target exhaust gas air-fuel ratio from the first actual exhaust gas air-fuel ratio to make it as the final injection amount. On the other hand, when the first actual exhaust gas air-fuel ratio is lower (richer) than the target exhaust gas air-fuel ratio, since it means the injection amount is excessive, the air-fuel ratio correcting module 113 carries out a correction to decrease the basic injection amount by an amount corresponding to a value obtained by subtracting the first actual exhaust gas air-fuel ratio from the target exhaust gas air-fuel ratio to make it as the final injection amount. In this embodiment, the injection amount is corrected by changing an injection period (a pulse width of the injection pulse of the injector 15).

Thus, in this embodiment, the injection amount is corrected based on the detection value of the linear A/F sensor SN11, so that the first actual exhaust gas air-fuel ratio becomes the target exhaust gas air-fuel ratio, i.e., the air-fuel ratio inside the combustion chamber 6 becomes the instructed target air-fuel ratio.

Next, the details of the controls carried out by the basic target air-fuel ratio setting module 111 and the target air-fuel ratio correcting module 112 are described. These controls differ in the first operating range A1 and the second operating range A2, and therefore, the details of these controls are described for each operating range. Moreover, the details of the control of the exhaust shutter valve 61 in the first operating range A1 are also described.

(Second Operating Range A2)

As described above, in the second operating range A2, the air-fuel ratio of the combustion chamber 6 is fundamentally made into the stoichiometric air-fuel ratio so that HC, CO, and $NO_x$ are purified by the three-way catalyst 41a. Therefore, if the operating range determining module 101 determines that the engine is operated in the second operating range A2, the basic target air-fuel ratio setting module 111 sets the basic target air-fuel ratio as the stoichiometric air-fuel ratio.

Here, if this basic target air-fuel ratio, i.e., the stoichiometric air-fuel ratio is made into the instructed target air-fuel ratio, the air-fuel ratio correcting module 113 adjusts the injection amount based on the detection value of the linear A/F sensor SN11 so that the air-fuel ratio of the combustion chamber 6 becomes the stoichiometric air-fuel ratio, as described above. However, as described above, the detection accuracy of the air-fuel ratio by the linear A/F sensor SN11 is comparatively low at near the stoichiometric air-fuel ratio. Therefore, there is a possibility that the air-fuel ratio in the three-way catalyst 41a cannot be controlled with sufficient accuracy to the stoichiometric air-fuel ratio, only by adjusting the injection amount based on the detection of the linear A/F sensor SN11. Moreover, for example, in association with a slowdown of the vehicle, when the fuel injection is suspended, a large amount of air may be introduced in the three-way catalyst 41a, and oxygen may be occluded in the three-way catalyst 41a. At this time, even if the air-fuel ratio upstream of the three-way catalyst 41a is the stoichiometric air-fuel ratio after a resumption of the fuel injection, the air-fuel ratio in the three-way catalyst 41a may become higher than the stoichiometric air-fuel ratio.

Therefore, in this embodiment, in order to make the air-fuel ratio in the three-way catalyst 41a into the stoichiometric air-fuel ratio more securely, the basic target air-fuel ratio is corrected so that the air-fuel ratio of exhaust gas detected by the $\lambda O_2$ sensor SN12 of which the detection accuracy of the air-fuel ratio near the stoichiometric air-fuel ratio is higher than the linear A/F sensor SN11, and which is provided downstream of the three-way catalyst 41a (hereinafter, suitably referred to as a second actual exhaust gas air-fuel ratio), becomes the stoichiometric air-fuel ratio. In detail, when the engine is operated in the second operating range A2, and the basic target air-fuel ratio is set as the stoichiometric air-fuel ratio, the target air-fuel ratio correcting module 112 calculates a difference between the second actual exhaust gas air-fuel ratio and the stoichiometric air-fuel ratio, and then calculates the correcting amount of the basic target air-fuel ratio according to the calculated difference. In detail, when the second actual exhaust gas air-fuel ratio is higher than the stoichiometric air-fuel ratio, the target air-fuel ratio correcting module 112 reduces a given amount from the basic target air-fuel ratio, and sets the reduced value as the instructed target air-fuel ratio. In this embodiment, this reducing amount is increased as the difference between the second actual exhaust gas air-fuel ratio and the stoichiometric air-fuel ratio becomes larger. Moreover, when the second actual exhaust gas air-fuel ratio is lower than the stoichiometric air-fuel ratio, the target air-fuel ratio correcting module 112 adds the given amount to the basic target air-fuel ratio, and then sets the added value as the instructed target air-fuel ratio. In this embodiment, this adding amount is increased as the difference between the second actual exhaust gas air-fuel ratio and the stoichiometric air-fuel ratio becomes larger.

(First Operating Range A1)

As described above, in the first operating range A1, the air-fuel ratio of the combustion chamber 6 is made higher than the stoichiometric air-fuel ratio so that raw $NO_x$ becomes smaller. Thus, if the operating range determining module 101 determines that the engine is operated in the first operating range A1, the basic target air-fuel ratio setting module 111 sets the basic target air-fuel ratio as a value higher than the stoichiometric air-fuel ratio. In this embodiment, the basic target air-fuel ratio in the first operating range A1 is stored in a map so as to be associated with the engine speed and the engine load, and the basic target air-fuel ratio setting module 111 extracts a value corresponding to the current engine speed and engine load from the map, and then sets it as the basic target air-fuel ratio.

By the air-fuel ratio inside the combustion chamber 6 being controlled by the air-fuel ratio correcting module 113 to be the basic target air-fuel ratio, the generated amount of raw $NO_x$ should become below a desired amount. However, for example, according to the variation due to the individual difference of the injector 15, a fuel-spray state of fuel injected from the injector 15 may differ from a state when the basic target air-fuel ratio is determined based on the map. Moreover, a flow state inside the combustion chamber 6 may differ from a state when the basic target air-fuel ratio is determined based on the map. In these cases, even if the air-fuel ratio inside the combustion chamber 6 is made into the basic target air-fuel ratio, the generated amount of raw $NO_x$ may exceed the desired value, and there is a possibility that the amount of $NO_x$ discharged from the engine may not be kept below the given value only by controlling the air-fuel ratio inside the combustion chamber 6 to the basic target air-fuel ratio based on the detection of the linear A/F sensor SN11.

Therefore, in this embodiment, the basic target air-fuel ratio is corrected so that the $NO_x$ concentration detected by the $NO_x$ sensor SN13, i.e., the concentration of $NO_x$ actually discharged from the engine (hereinafter, suitably referred to as an "actual $NO_x$ concentration") becomes below a preset target value. In detail, when the engine is operated in the first operating range A1 and the basic target air-fuel ratio is set as a value higher than the stoichiometric air-fuel ratio, the target air-fuel ratio correcting module 112 calculates a difference between the actual $NO_x$ concentration and a target $NO_x$ concentration which is its target value, and then calculates a correcting amount of the basic target air-fuel ratio according to this difference. In more detail, when the actual $NO_x$ concentration is higher than the target $NO_x$ concentration, the target air-fuel ratio correcting module 112 adds a given amount to the basic target air-fuel ratio so that the air-fuel ratio inside the combustion chamber 6 is made high (lean), and then sets the added value as the instructed target air-fuel ratio. In this embodiment, this adding amount is increased as the difference between the actual $NO_x$ concentration and the target $NO_x$ concentration becomes larger. Moreover, when the actual $NO_x$ concentration is lower than the target $NO_x$ concentration, the target air-fuel ratio correcting module 112 deducts a given amount from the basic target air-fuel ratio so that the air-fuel ratio inside the combustion chamber 6 is made low (rich), and then sets the deducted value as the instructed target air-fuel ratio. In this embodiment, this deducted amount is increased as the difference between the actual $NO_x$ concentration and the target $NO_x$ concentration becomes larger.

(5) Control of Exhaust Shutter Valve in First Operating Range A1

As described above, in the first operating range A1, the target air-fuel ratio, i.e., the air-fuel ratio inside the combustion chamber 6 is controlled so that the actual $NO_x$ concentration which is the $NO_x$ concentration detected by the $NO_x$ sensor SN13 becomes the target $NO_x$ concentration. When the actual $NO_x$ concentration exceeds the target $NO_x$ concentration, the target air-fuel ratio, i.e., the air-fuel ratio inside the combustion chamber 6 is made leaner than the preset basic target air-fuel ratio. The basic target air-fuel ratio in the first operating range A1 is leaner than the stoichiometric air-fuel ratio. Therefore, in the first operating range A1, when the actual $NO_x$ concentration exceeded the target $NO_x$ concentration, the air-fuel ratio inside the combustion chamber 6 may become very high. When the air-fuel ratio inside the combustion chamber 6 becomes very high, combustion stability becomes worse and there is a possibility that the suitable SPCCI combustion cannot be achieved.

Therefore, in this embodiment, when the engine is operated in the first operating range A1, if a particular condition that the target value of the air-fuel ratio inside the combustion chamber 6, i.e., the instructed target air-fuel ratio becomes higher (leaner) than a preset combustion limit air-fuel ratio is satisfied, the temperature inside the combustion chamber 6 is raised. As the temperature inside the combustion chamber 6 rises, the combustion of the mixture gas is stimulated, and therefore, the degradation of combustion stability is reduced. The combustion limit air-fuel ratio is an upper limit of the air-fuel ratio inside the combustion chamber 6 when SPCCI combustion is achieved, and is set beforehand and stored in the ECU 100. The combustion limit air-fuel ratio is, for example, set as about 35:1 to 40:1. This combustion limit air-fuel ratio is one example of an "upper limit."

In this embodiment, the temperature inside the combustion chamber 6 is raised by setting the opening of the exhaust shutter valve 61 on the closing side from a fully open position and increasing the internal EGR gas amount. That is, when the exhaust shutter valve 61 is operated toward the closing side, the channel area of the exhaust passage 40 decreases to raise the engine back pressure, and therefore, the amount of exhaust gas which flows out of the combustion chamber 6 into the exhaust passage 40 decreases. Therefore, the amount of internal EGR gas which is the burnt gas remaining inside the combustion chamber 6 increases. The internal EGR gas is the burnt gas and is high in the temperature. Therefore, the temperature inside the combustion chamber 6 rises by increasing the amount of internal EGR gas. This control of the exhaust shutter valve 61 is carried out by the exhaust shutter valve controlling module 103. Thus, in this embodiment, the exhaust shutter valve 61 is one example of an "in-cylinder temperature changer," which changes the temperature inside the combustion chamber 6, and is also one example of an "internal EGR amount changing part," which increases the internal EGR gas amount.

Figure 6:
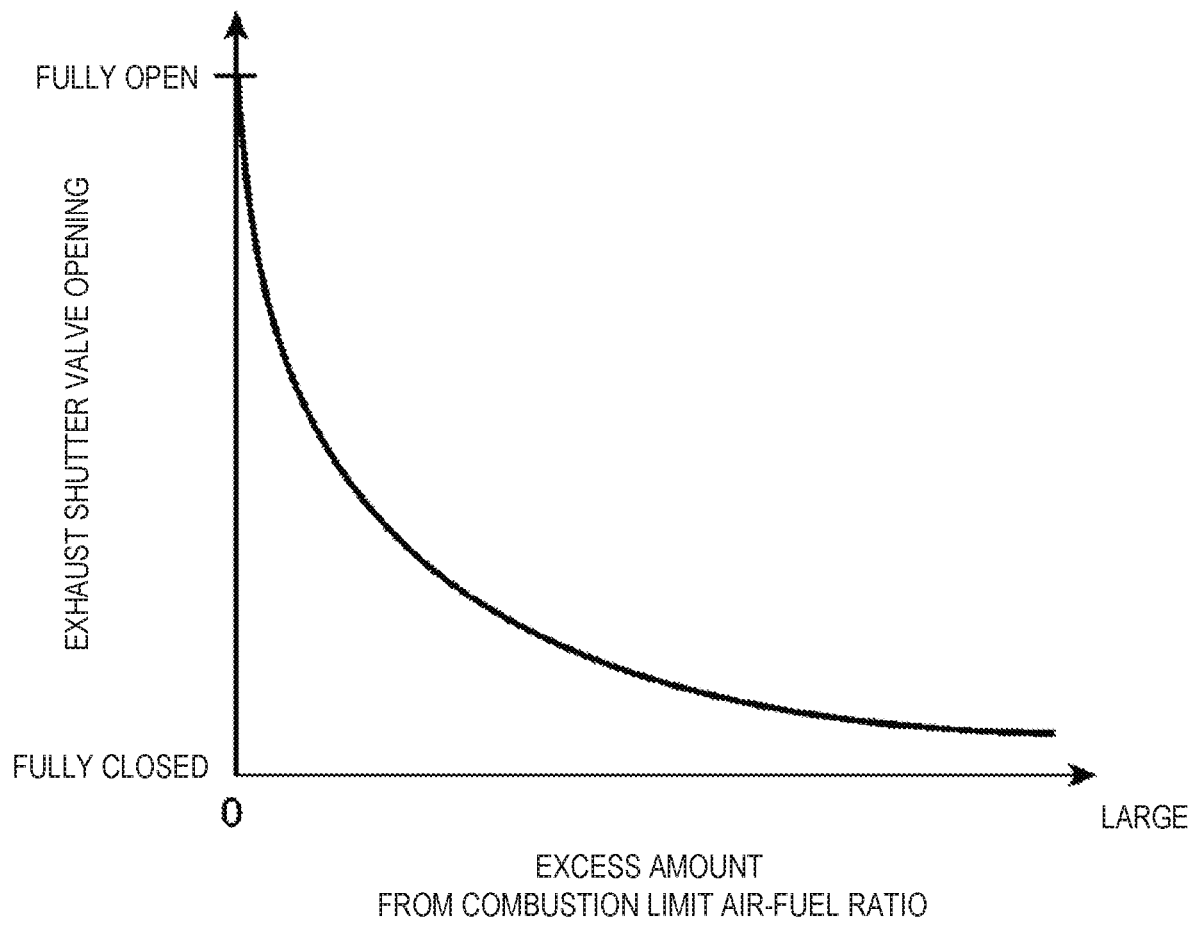
FIG. 6 is a graph illustrating a relation between a valve opening of an exhaust shutter valve, and a difference between a combustion limit air-fuel ratio and an instructed target air-fuel ratio.

When the instructed target air-fuel ratio set by the target air-fuel ratio correcting module 112 exceeds the combustion limit air-fuel ratio, the exhaust shutter valve controlling module 103 closes the exhaust shutter valve 61 to an opening toward the closing side from the fully open position. In detail, the exhaust shutter valve controlling module 103 issues an instruction to the device which drives the exhaust shutter valve 61 so that the opening of the exhaust shutter valve 61 is closed toward the opening on the closing side from the fully open position. The exhaust shutter valve controlling module 103 sets the opening of the exhaust shutter valve 61 to a value obtained by subtracting the combustion limit air-fuel ratio from the instructed target air-fuel ratio, i.e., so that the opening of the exhaust shutter valve 61 becomes smaller (the more closing side opening) as the excess amount of the instructed target air-fuel ratio to the combustion limit air-fuel ratio increases. For example, as illustrated in FIG. 6, the opening of the exhaust shutter valve 61 is made smaller as the excess amount increases.

(6) Control Flow

Figure 7:
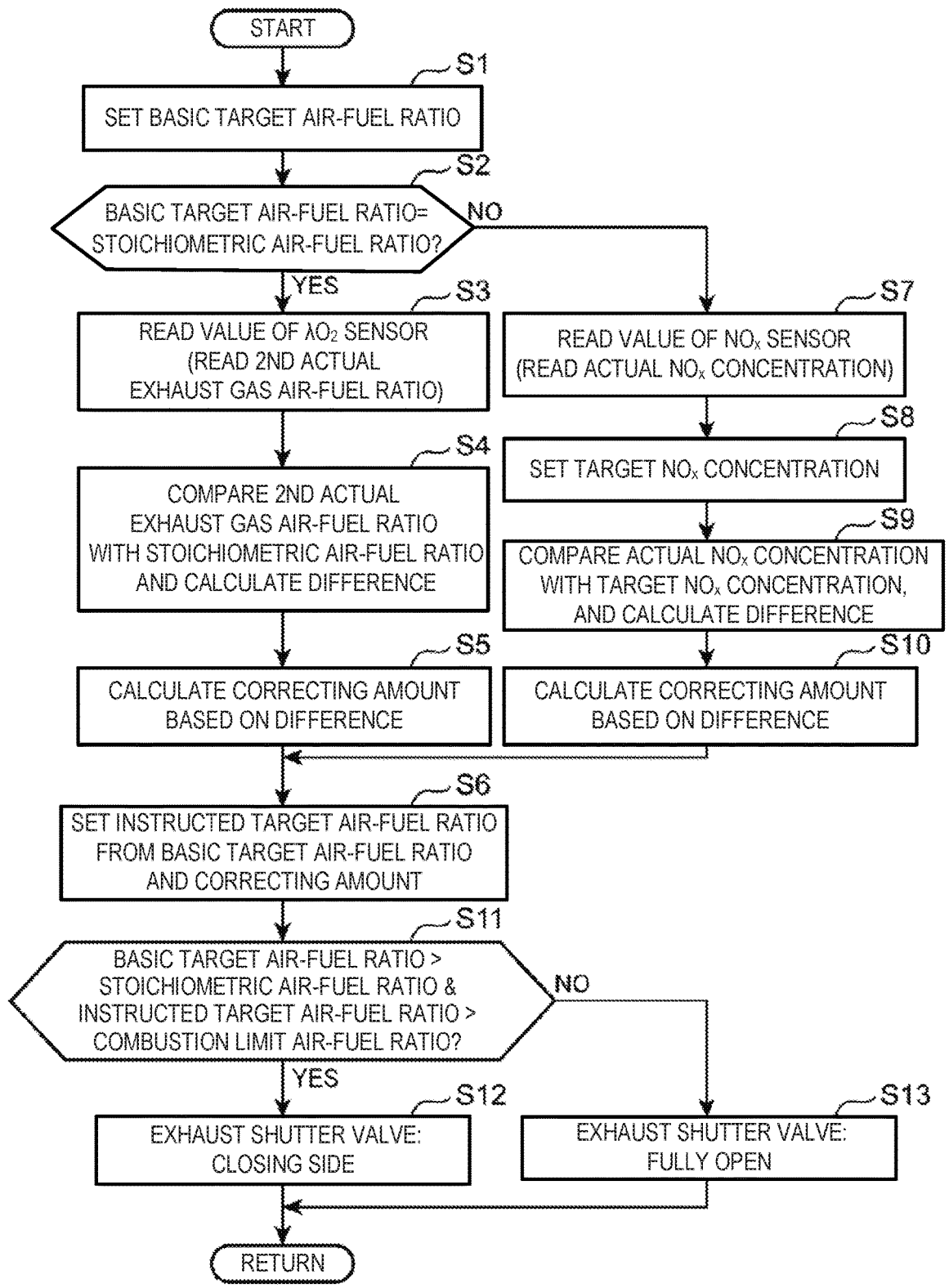
FIG. 7 is a flowchart illustrating a flow of a correction of a target air-fuel ratio and a control of the exhaust shutter valve.
Figure 8:
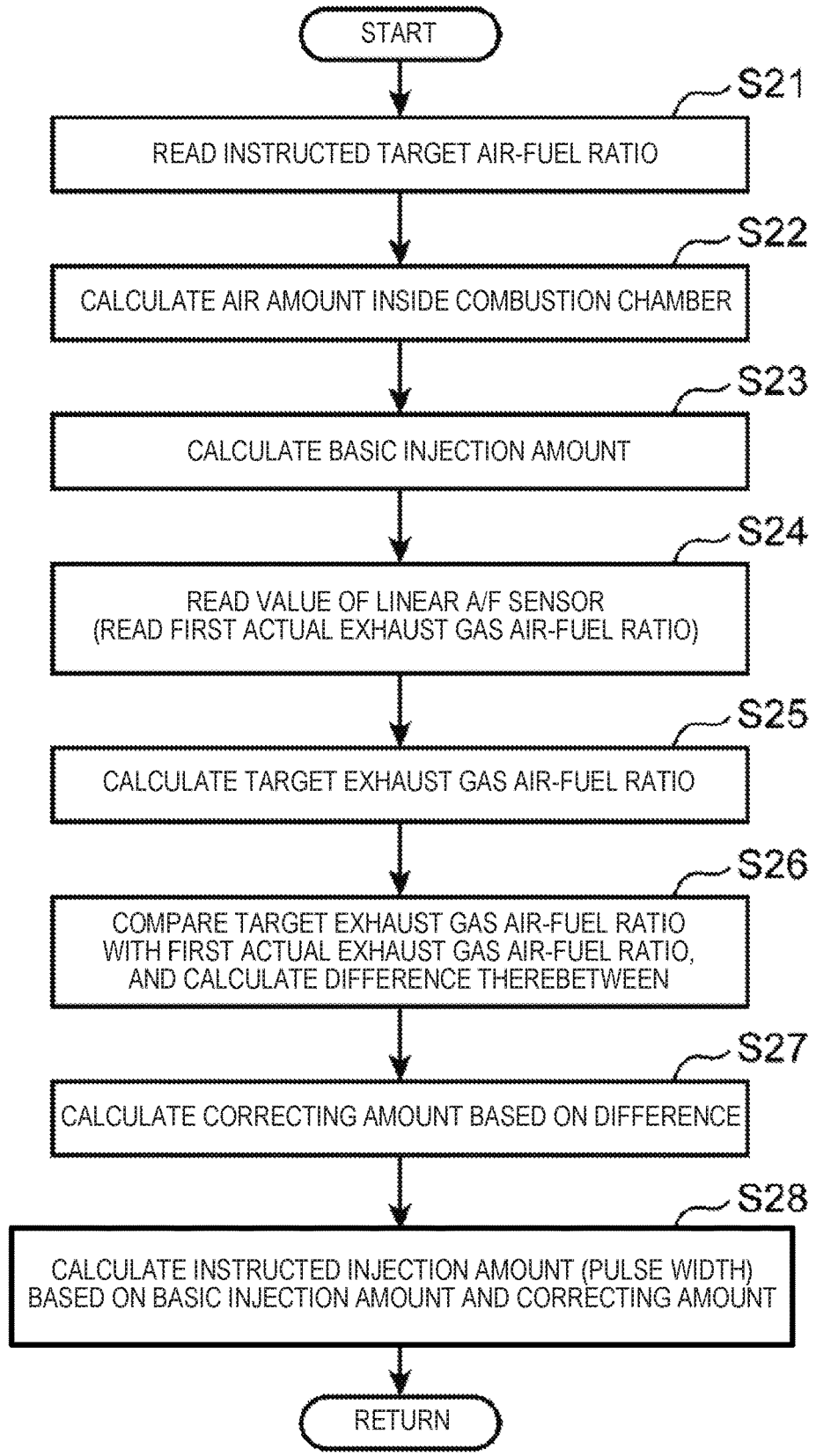
FIG. 8 is a flowchart illustrating a flow of a correction of the air-fuel ratio.

If the control of the air-fuel ratio and the control of the exhaust shutter valve 61 which are performed during the execution of SPCCI combustion are summarized, they become like flowcharts illustrated in FIGS. 7 and 8. FIG. 7 illustrates a calculation procedure of the target air-fuel ratio and the control of the exhaust shutter valve. FIG. 8 illustrates a control procedure for implementing the target air-fuel ratio carried out by the air-fuel ratio correcting module 113, i.e., a procedure for correcting the air-fuel ratio of the combustion chamber.

In the flowchart of FIG. 7, the ECU 100 first sets the basic target air-fuel ratio at Step S1. As described above, when the engine is operated in the second operating range A2, the basic target air-fuel ratio is set as the stoichiometric air-fuel ratio, and when the engine is operated in the first operating range A1, the basic target air-fuel ratio is set as a preset value which is higher than the stoichiometric air-fuel ratio.

Next, at Step S2, the ECU 100 determines whether the basic target air-fuel ratio is the stoichiometric air-fuel ratio. That is, the ECU 100 determines whether the engine is operated in the first operating range A1 or the second operating range A2.

If the determination at Step S2 is YES and the basic target air-fuel ratio is set as the stoichiometric air-fuel ratio, i.e., the engine is operated in the second operating range A2, the ECU 100 shifts to Step S3. At Step S3, the ECU 100 reads the detection value of the $\lambda O_2$ sensor SN12. That is, the ECU 100 reads the second actual exhaust gas air-fuel ratio detected by the $\lambda O_2$ sensor SN12. Next, at Step S4, the ECU 100 compares the second actual exhaust gas air-fuel ratio with the stoichiometric air-fuel ratio and calculates a difference therebetween. Next, at Step S5, the ECU 100 calculates the correcting amount of the basic target air-fuel ratio based on the comparison result and the difference of the second actual exhaust gas air-fuel ratio and the stoichiometric air-fuel ratio read at Step S4. Then, at Step S6, the ECU 100 corrects the basic target air-fuel ratio set at Step S1 (the basic target air-fuel ratio=the stoichiometric air-fuel ratio at Step S6 after Step S5) by the correcting amount which is calculated at Step S5, and sets the corrected air-fuel ratio as the instructed target air-fuel ratio.

On the other hand, if the determination at Step S2 is NO and the basic target air-fuel ratio is not the stoichiometric air-fuel ratio, i.e., if the basic target air-fuel ratio is higher than the stoichiometric air-fuel ratio and the engine is operated in the first operating range A1, the ECU 100 shifts to Step S7. At Step S7, the ECU 100 reads the detection value of the $NO_x$ sensor SN13. That is, the ECU 100 reads the actual $NO_x$ concentration which is the $NO_x$ concentration of exhaust gas detected by the $NO_x$ sensor SN13. Next, at Step S8, the ECU 100 sets the target $NO_x$ concentration. Next, at Step S9, the ECU 100 compares the actual $NO_x$ concentration with the target $NO_x$ concentration and calculates a difference therebetween. Next, at Step S10, the ECU 100 calculates the correcting amount of the basic target air-fuel ratio based on the comparison result and the difference of the actual $NO_x$ concentration and the target $NO_x$ concentration calculated at Step S9. Then, the ECU 100 shifts to Step S6. Then, at Step S6, the ECU 100 corrects the basic target air-fuel ratio set at Step S1 (the basic target air-fuel ratio is a value higher than the stoichiometric air-fuel ratio at Step S6 after Step S10) by the correcting amount which is calculated at Step S10, and the corrected air-fuel ratio is set as the instructed target air-fuel ratio.

After Step S6, the ECU 100 shifts to Step S11. At Step S11, the ECU 100 determines whether a condition that the basic target air-fuel ratio is higher than the stoichiometric air-fuel ratio and the instructed target air-fuel ratio set at Step S6 is higher than the combustion limit air-fuel ratio is satisfied. If the determination at Step S11 is NO and the basic target air-fuel ratio is below the stoichiometric air-fuel ratio or the instructed target air-fuel ratio is below the combustion limit air-fuel ratio, the ECU 100 shifts to Step S13. At Step S13, the ECU 100 fully opens the exhaust shutter valve 61. On the other hand, if the determination at Step S11 is YES, the basic target air-fuel ratio is higher than the stoichiometric air-fuel ratio, i.e., if the engine is operated in the first operating range A1 and the instructed target air-fuel ratio is higher (leaner) than the combustion limit air-fuel ratio, the ECU 100 shifts to Step S12. At Step S12, the ECU 100 determines the opening of the exhaust shutter valve 61 based on the difference between the instructed target air-fuel ratio and the combustion limit air-fuel ratio. As described above, the opening of the exhaust shutter valve 61 is made smaller (toward the opening on the closing side) as the difference becomes larger, and an increasing amount of the temperature inside the combustion chamber 6 is increased as the difference becomes larger.

In the flowchart of FIG. 8, the ECU 100 first reads at Step S21 the instructed target air-fuel ratio calculated as described above. Next, at Step S22, the ECU 100 estimates the amount of air inside the combustion chamber 6 based on the flow rate of the intake air detected by the airflow sensor SN3, etc. Next, at Step S23, the ECU 100 calculates, as the basic injection amount, the amount of the fuel based on the estimated amount of air inside the combustion chamber 6 and the instructed target air-fuel ratio read at Step S21 so that air-fuel ratio becomes the instructed target air-fuel ratio at the estimated amount of air inside the combustion chamber 6. Next, at Step S24, the ECU 100 reads the detection value of the linear A/F sensor SN11. That is, the ECU 100 reads the first actual exhaust gas air-fuel ratio which is the air-fuel ratio of exhaust gas detected by the linear A/F sensor SN11. Next, at Step S25, the ECU 100 calculates the target exhaust gas air-fuel ratio which is the air-fuel ratio of exhaust gas corresponding to the instructed target air-fuel ratio (the air-fuel ratio of exhaust gas at the position of the linear A/F sensor SN11). Next, at Step S26, the ECU 100 compares the target exhaust gas air-fuel ratio calculated at Step S25 with the first actual exhaust gas air-fuel ratio, and calculates a difference therebetween. Next, at Step S27, the ECU 100 calculates the correcting amount of the injection amount based on the comparison result and the difference of the target exhaust gas air-fuel ratio and the first actual exhaust gas air-fuel ratio which are calculated at Step S26. Next, at Step S28, the ECU 100 corrects the basic injection amount calculated at Step S23 by the correcting amount calculated at Step S27, and sets it as the final injection amount. After that, the ECU 100 issues an instruction to the injector 15 so as to inject by an injection pulse corresponding to the final injection amount.

Figure 9:
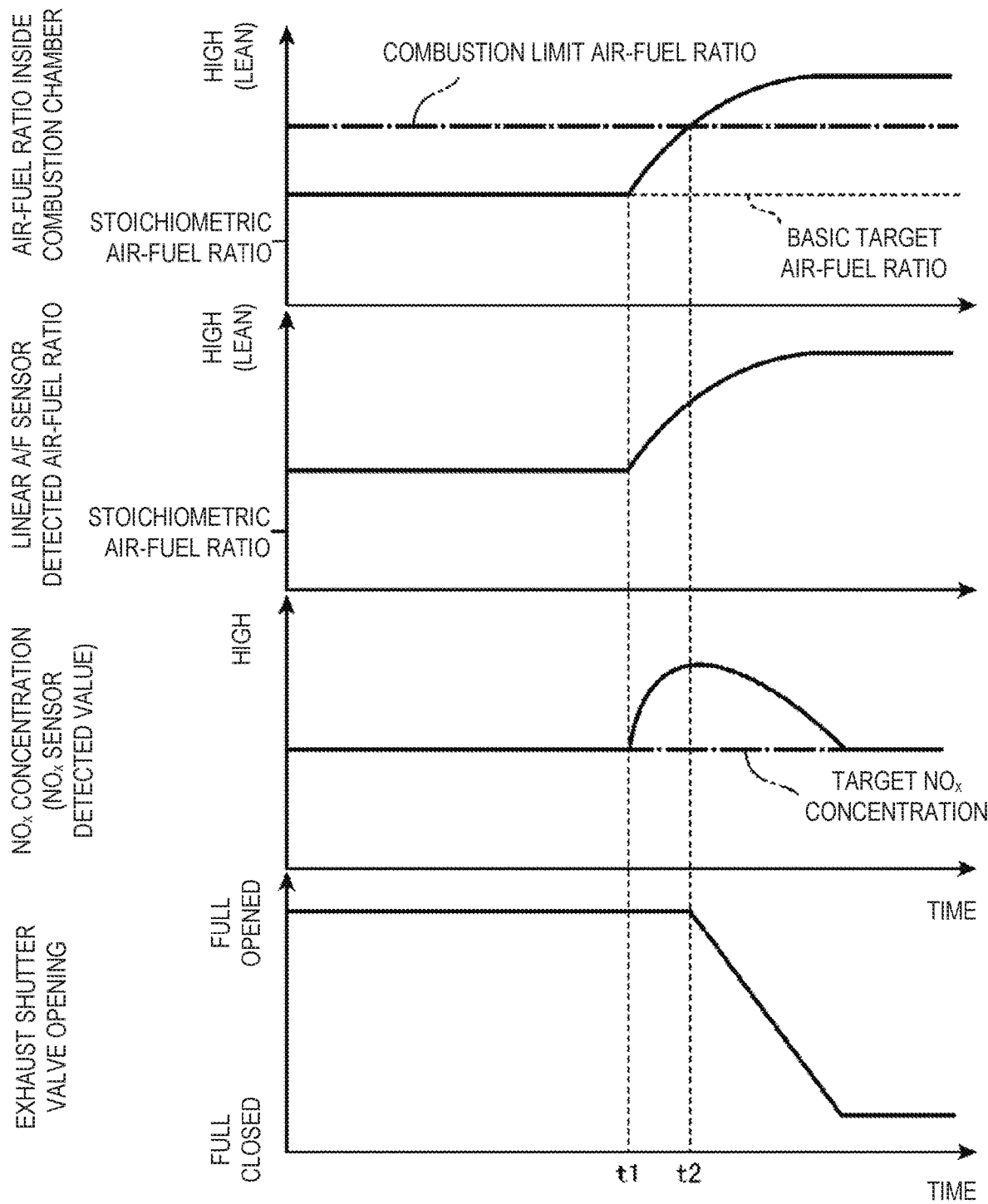
FIG. 9 is a time chart illustrating operations and effects of this embodiment.

FIG. 9 schematically illustrates a change in each parameter with time, when the engine is operated in the first operating range A1. In FIG. 9, the air-fuel ratio inside the combustion chamber 6, the air-fuel ratio of exhaust gas upstream of the three-way catalyst 41a (the air-fuel ratio of exhaust gas detected by the linear A/F sensor SN11), the $NO_x$ concentration of exhaust gas downstream of the three-way catalyst 41a (the $NO_x$ concentration of exhaust gas detected by the $NO_x$ sensor SN13), and the opening of the exhaust shutter valve 61 are illustrated in this order from above. Moreover, FIG. 9 illustrates one example when the injecting state of the injector 15 and the flow inside the combustion chamber 6 are deviated at a time t1 from the state when the basic target air-fuel ratio is set, and $NO_x$ is increased. As for the air-fuel ratio inside the combustion chamber 6 in FIG. 9, a solid line is an actual value of the air-fuel ratio inside the combustion chamber 6, and a broken line is the basic target air-fuel ratio, and a chain line is the combustion limit air-fuel ratio.

Until the time t1 in FIG. 9, the target air-fuel ratio is made as the basic target air-fuel ratio which is leaner than the stoichiometric air-fuel ratio. Then, by the correction control of the injection amount based on the detection value of the linear A/F sensor SN11, the air-fuel ratio inside the combustion chamber 6 is maintained at the basic target air-fuel ratio. Moreover, at this time, the exhaust shutter valve 61 is fully opened. On the other hand, at the time t1, when the $NO_x$ concentration detected by the $NO_x$ sensor SN13, i.e., the actual $NO_x$ concentration exceeds the target $NO_x$ concentration, the target air-fuel ratio is corrected to be a leaner value higher than the basic target air-fuel ratio based on the detection value of the $NO_x$ sensor SN13. Thus, when target air-fuel ratio is made to lean, the actual air-fuel ratio inside the combustion chamber 6 is also corrected to the leaner side accordingly by the reducing correction of the injection amount, and therefore, the $NO_x$ concentration of exhaust gas is reduced. Here, at a time t2, when the target air-fuel ratio exceeds the combustion limit air-fuel ratio illustrated by the chain line, the control for closing the exhaust shutter valve 61 toward the closing side begins, and thus, the exhaust shutter valve 61 is operated toward the closing side from the fully open position. The exhaust shutter valve 61 is maintained at the opening on the closing side from the fully open until the target air-fuel ratio becomes below the basic target air-fuel ratio.

(7) Operations

As described above, according to this embodiment, when the air-fuel ratio inside the combustion chamber 6 is changed based on the actual $NO_x$ concentration detected by the $NO_x$ sensor SN13, and the particular condition that the air-fuel ratio inside the combustion chamber 6 is higher than the preset combustion limit air-fuel ratio is satisfied, the temperature inside the combustion chamber 6 is increased.

Therefore, since the air-fuel ratio inside the combustion chamber 6 is made into the air-fuel ratio so that the $NO_x$ concentration of exhaust gas becomes the desired concentration, the amount of $NO_x$ discharged from the engine can be securely lowered, and since the combustion is stimulated when the particular condition is satisfied, the decline in combustion stability caused by the air-fuel ratio inside the combustion chamber 6 becoming high in connection with the control based on $NO_x$ concentration can be prevented.

Moreover, in this embodiment, when the particular condition is satisfied, the temperature inside the combustion chamber 6 is raised by increasing the amount of internal EGR gas. Therefore, the temperature increase can be achieved with the simple configuration.

In particular, in this embodiment, the exhaust shutter valve 61 which can open and close the exhaust passage 40 is provided, and when the particular condition is satisfied, the exhaust shutter valve 61 is closed to the opening on the closing side. Therefore, a large amount of internal EGR gas can remain inside the combustion chamber 6, and therefore, the temperature inside the combustion chamber 6 can be raised quickly.

Moreover, in this embodiment, the target air-fuel ratio which is the target value of the air-fuel ratio inside the combustion chamber 6 is corrected based on the actual $NO_x$ concentration detected by the $NO_x$ sensor SN13. The air-fuel ratio inside the combustion chamber 6 (in this embodiment, the injection amount of the injector 15) is controlled so that the corrected target air-fuel ratio is achieved, and if the target air-fuel ratio becomes higher than the combustion limit air-fuel ratio, the particular condition is determined to be satisfied. Therefore, before or immediately after the air-fuel ratio inside the combustion chamber 6 actually becomes higher than the combustion limit air-fuel ratio, the temperature inside the combustion chamber 6 can be raised, and therefore, the decline in combustion stability can be prevented more securely.

Moreover, in this embodiment, when the particular condition is satisfied, the increasing amount of the temperature inside the cylinder is increased as the difference between the target air-fuel ratio which is the target value of the air-fuel ratio inside the combustion chamber 6 and the combustion limit air-fuel ratio is larger. Therefore, the temperature inside the combustion chamber 6 can be appropriately raised according to the degrading condition of combustion stability.

Moreover, in this embodiment, the target air-fuel ratio is corrected so that the actual $NO_x$ concentration detected by the $NO_x$ sensor SN13 becomes below the target $NO_x$ concentration. Therefore, the amount of $NO_x$ discharged from the engine can be kept low more securely.

Moreover, in this embodiment, the air-fuel ratio inside the combustion chamber 6 is controlled based on the actual $NO_x$ concentration detected by the $NO_x$ sensor SN13, in the first operating range A1 where SPCCI combustion is performed. Therefore, the discharging amount of $NO_x$ can be reduced by the air-fuel ratio control based on the actual $NO_x$ concentration, while improving fuel efficiency by the execution of SPCCI combustion.

(8) Modifications

Although in the above embodiment the exhaust shutter valve 61 begins to be closed when the target air-fuel ratio exceeds the combustion limit air-fuel ratio, the actual air-fuel ratio inside the combustion chamber 6 may be estimated instead of the target air-fuel ratio, and when the estimated value exceeds the combustion limit air-fuel ratio, the exhaust shutter valve 61 may begin to be closed. Note that if the closing of the exhaust shutter valve 61 is started based on the target air-fuel ratio, the temperature inside the combustion chamber 6 can be raised immediately before or immediately after the actual air-fuel ratio of the combustion chamber 6 exceeds the combustion limit air-fuel ratio, and therefore, the degradation of combustion stability can be prevented more securely.

In the above embodiment, although the temperature inside the combustion chamber 6 is raised by closing the exhaust shutter valve 61 toward the closing side when the target air-fuel ratio exceeds the combustion limit air-fuel ratio, the temperature inside the combustion chamber 6 may also be raised using other methods. For example, the overlap period of the intake valve 11 and the exhaust valve 12 may be extended to increase the internal EGR gas amount in order to raise the temperature inside the combustion chamber 6. Alternatively, once the exhaust valve 12 is closed, it is again opened during the intake stroke to increase the amount of exhaust gas which again flows into the combustion chamber 6 during the intake stroke in order to increase the internal EGR gas amount. That is, in some embodiments, the exhaust VVT 14a, or both the exhaust VVT 14a and the intake VVT 13a may function as an "in-cylinder temperature changer." Note that in the first operating range A1, since it is necessary to increase the air-fuel ratio inside the combustion chamber 6, the amount of air introduced into the combustion chamber 6 becomes very large. Therefore, the increasing amount of the internal EGR gas amount obtained by the change in the open and close timings of the intake valve 11 and the exhaust valve 12 is comparatively less. Thus, if the exhaust shutter valve 61 is used, the internal EGR gas amount can be increased more securely and the temperature inside the combustion chamber 6 can be raised effectively.

In the above embodiment, although the target air-fuel ratio is corrected so that the $NO_x$ concentration becomes the preset target $NO_x$ concentration, the target air-fuel ratio may instead be corrected so that the $NO_x$ concentration becomes below the target $NO_x$ concentration.

Although in the above embodiment the detection value of the $NO_x$ sensor SN13 is directly compared with the target $NO_x$ concentration, and the target air-fuel ratio is corrected based on the comparison result, the $NO_x$ concentration of exhaust gas may be estimated using a model calculation, the detection value of the $NO_x$ sensor SN13 may be used for learning the error of the estimated value of the $NO_x$ concentration (a so-called model error), and the target air-fuel ratio may be corrected based on a difference between the estimated value of the $NO_x$ concentration after being corrected based on the detection value of the $NO_x$ sensor SN13, and the target $NO_x$ concentration.

Although in the above embodiment the target air-fuel ratio is corrected using the detection values of the $\lambda O_2$ sensor SN12 and the $NO_x$ sensor SN13 in the first operating range A1 and the second operating range A2 where SPCCI combustion is carried out, this correction may also be applied when combustion other than SPCCI combustion is performed. Note that since fuel efficiency can be improved if SPCCI combustion is carried out, fuel efficiency can be improved remarkably, if SPCCI combustion is carried out while the air-fuel ratio inside the combustion chamber 6 is made leaner than the stoichiometric air-fuel ratio like in the first operating range A1. In addition, in this case, since $NO_x$ is not fully purified by the three-way catalyst 41a, it is no longer necessary to control the air-fuel ratio inside the combustion chamber 6 with more accuracy in order to securely reduce $NO_x$. Therefore, in such a case, if the target air-fuel ratio is corrected using the detection value of the $NO_x$ sensor SN13, $NO_x$ can be reduced securely while improving fuel efficiency. Further, since there is a possibility that combustion stability may become worse in association with the control of the air-fuel ratio, if the control which raises the temperature inside the combustion chamber 6 according to this embodiment is carried out in the case described above, the decline in combustion stability can also be prevented and the engine performance can be improved effectively.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine Body
2 Cylinder
6 Combustion Chamber
15 Injector
16 Ignition Plug
41a Three-way Catalyst
61 Exhaust Shutter Valve
100 ECU (Controller)
SN11 Linear A/F Sensor
SN12 $\lambda O_2$ Sensor
SN13 $NO_x$ Sensor

What is claimed is:
1. A control device for an engine provided with an engine body where a cylinder is formed, and an exhaust passage through which exhaust gas discharged from the engine body circulates, the control device comprising:
    a $NO_x$ sensor disposed in the exhaust passage and configured to detect a concentration of $NO_x$ in the exhaust gas;
    an injector configured to change an air-fuel ratio inside the cylinder;

an in-cylinder temperature changer configured to change a temperature inside the cylinder, the in-cylinder temperature changer including:
- an exhaust shutter valve;
- an exhaust variable valve timing mechanism (VVT); or the exhaust VVT and an intake VVT; and
- a controller including a processor configured to control the injector and the in-cylinder temperature changer, the controller controlling the injector based on a detection value of the $NO_x$ sensor to variably set the air-fuel ratio inside the cylinder, and when a particular condition that the air-fuel ratio inside the cylinder is leaner than a preset upper limit is satisfied, the controller causing the in-cylinder temperature changer to raise the temperature inside the cylinder.

2. The control device of claim 1,
wherein the in-cylinder temperature changer includes the exhaust shutter valve, and is further configured to change an amount of internal exhaust gas recirculation (EGR) gas that is exhaust gas remaining inside the cylinder, and
wherein when the particular condition is satisfied, the controller controls the exhaust shutter valve to increase the amount of internal EGR gas.

3. The control device of claim 2,
wherein the exhaust shutter valve is provided in the exhaust passage and configured to open and close the exhaust passage, and
wherein when the particular condition is satisfied, the controller controls the exhaust shutter valve to adjust an opening of the exhaust shutter valve toward a closing side.

4. The control device of claim 1, wherein when the particular condition is satisfied, the controller controls the in-cylinder temperature changer so that an increasing amount of the temperature inside the cylinder becomes larger as a difference between the air-fuel ratio inside the cylinder and the upper limit increases.

5. The control device of claim 1, wherein the controller controls the injector to correct a target air-fuel ratio that is a target value of the air-fuel ratio inside the cylinder based on the detection value of the $NO_x$ sensor so that the corrected target air-fuel ratio is achieved, and when the corrected target air-fuel ratio becomes leaner than the upper limit, the controller determines that the particular condition is satisfied.

6. The control device of claim 5, wherein when the particular condition is satisfied, the controller controls the in-cylinder temperature changer valve so that an increasing amount of the temperature inside the cylinder becomes larger as a difference between the target air-fuel ratio and the upper limit increases.

7. The control device of claim 5, further comprising an air-fuel ratio sensor disposed in the exhaust passage and configured to detect an air-fuel ratio in the exhaust gas,
wherein the controller controls the injector to correct the target air-fuel ratio that is the target value of the air-fuel ratio inside the cylinder based on the detection value of the $NO_x$ sensor,
wherein the controller controls the injector so that the corrected target air-fuel ratio is achieved based on a difference between a detection value of the air-fuel ratio sensor and the corrected target air-fuel ratio, and
wherein when the corrected target air-fuel ratio becomes leaner than the upper limit, the controller determines that the particular condition is satisfied.

8. The control device of claim 1, wherein the controller controls the injector so that the concentration of $NO_x$ detected by the $NO_x$ sensor becomes below a preset target value.

9. The control device of claim 1,
wherein the controller controls the injector so that partial compression ignition combustion in which spark ignition (SI) combustion of a portion of a mixture gas inside the cylinder is forcibly carried out by jump-spark ignition, and compression ignition (CI) combustion of the remaining mixture gas inside the cylinder is then carried out by self-ignition is performed at least in a part of an operating range of the engine, and
wherein the controller controls the injector based on the detection value of the $NO_x$ sensor at least in a part of the operating range where the partial compression ignition combustion is performed.

10. The control device of claim 1,
wherein the in-cylinder temperature changer includes the exhaust VVT, and
the controller is configured to open the exhaust VVT in the intake stroke to increase the in-cylinder temperature.

11. The control device of claim 1,
wherein the in-cylinder temperature changer includes the exhaust VVT and the intake VVT, and
wherein the controller is configured to extend an overlap period of an intake valve and an exhaust to increase the in-cylinder temperature.

12. A method of controlling an engine comprising the steps of:
variably setting an air-fuel ratio inside a cylinder formed in an engine body of the engine based on a concentration of $NO_x$ in exhaust gas detected by a $NO_x$ sensor disposed in an exhaust passage through which the exhaust gas discharged from the engine body circulates; and
when a particular condition that the air-fuel ratio inside the cylinder is leaner than a preset upper limit is satisfied, raising a temperature inside the cylinder.

* * * * *